US009609274B2

(12) United States Patent
Tamura

(10) Patent No.: US 9,609,274 B2
(45) Date of Patent: Mar. 28, 2017

(54) COMMUNICATION MANAGEMENT SYSTEM, COMMUNICATION TERMINAL, COMMUNICATION SYSTEM, AND RECORDING MEDIUM

(71) Applicant: Hideki Tamura, Kanagawa (JP)

(72) Inventor: Hideki Tamura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 126 days.

(21) Appl. No.: 14/332,842

(22) Filed: Jul. 16, 2014

(65) Prior Publication Data
US 2015/0029937 A1 Jan. 29, 2015

(30) Foreign Application Priority Data

Jul. 26, 2013 (JP) ................................. 2013-155524

(51) Int. Cl.
H04L 12/66 (2006.01)
H04M 3/42 (2006.01)
H04N 7/15 (2006.01)
H04L 29/06 (2006.01)

(52) U.S. Cl.
CPC ........... H04N 7/15 (2013.01); H04L 65/1069 (2013.01); H04L 65/1073 (2013.01); H04L 65/403 (2013.01); H04N 7/155 (2013.01)

(58) Field of Classification Search
CPC ......... H04N 21/4122; H04N 21/43637; H04N 21/43615; H04L 12/1813; H04L 65/4046; H04L 29/06; H04L 65/403
See application file for complete search history.

(56) References Cited

U.S. PATENT DOCUMENTS

| 5,642,156 | A | * | 6/1997 | Saiki | ........................ H04N 7/15 348/14.09 |
| 5,916,302 | A | * | 6/1999 | Dunn | ....................... H04L 29/06 365/189.011 |
| 6,404,873 | B1 | * | 6/2002 | Beyda | ................. H04L 12/1813 379/202.01 |
| 6,608,831 | B1 | * | 8/2003 | Beckstrom | .......... H04L 12/5601 370/352 |
| 7,233,979 | B2 | * | 6/2007 | Dickerman | ........... H04L 12/581 709/203 |

(Continued)

FOREIGN PATENT DOCUMENTS

| JP | 2005-109922 | 4/2005 |
| JP | 2013-085208 | 5/2013 |

Primary Examiner — Melanie Jagannathan
(74) Attorney, Agent, or Firm — Oblon, McClelland, Maier & Neustadt, L.L.P.

(57) ABSTRACT

A communication management system manages session information regarding a contents data session being established to communicate contents data among a plurality of participating communication terminals, and receives a request for registering a group of the plurality of participating communication terminals that are currently participating in the session, from a first participating communication terminal of the plurality of participating communication terminals, during when the session is being established. In response to the request for registering, the communication management system stores first candidate information of the first participating communication terminal in a first memory, the first candidate information associating the group of the plurality of participating communication terminals with the first participating communication terminal.

11 Claims, 16 Drawing Sheets

(56) References Cited

U.S. PATENT DOCUMENTS

| | | | | |
|---|---|---|---|---|
| 8,234,335 | B1* | 7/2012 | Haldar | H04L 65/4061 709/204 |
| 9,270,474 | B2* | 2/2016 | Skaflestad | H04L 12/1818 |
| 2002/0065928 | A1* | 5/2002 | Senga | H04L 29/06 709/231 |
| 2003/0208543 | A1* | 11/2003 | Enete | H04L 12/1822 709/206 |
| 2004/0064322 | A1* | 4/2004 | Georgiopoulos | G10L 15/26 704/277 |
| 2005/0259638 | A1* | 11/2005 | Burg | H04L 12/1813 370/352 |
| 2006/0101143 | A1* | 5/2006 | Garcia | H04L 12/1818 709/225 |
| 2007/0150583 | A1* | 6/2007 | Asthana | G06Q 10/06 709/224 |
| 2007/0274283 | A1* | 11/2007 | Baker | H04L 12/1818 370/351 |
| 2009/0049494 | A1* | 2/2009 | Freundlich | H04N 21/4122 725/110 |
| 2009/0094531 | A1* | 4/2009 | Danieli | H04M 7/0027 715/753 |
| 2010/0287242 | A1* | 11/2010 | Kumar | G06Q 10/10 709/206 |
| 2012/0128146 | A1* | 5/2012 | Boss | H04M 3/56 379/202.01 |
| 2013/0124723 | A1* | 5/2013 | Bao | H04L 65/1016 709/224 |
| 2014/0025767 | A1* | 1/2014 | De Kezel | G06Q 10/107 709/206 |
| 2016/0057391 | A1* | 2/2016 | Block | H04L 65/4023 348/14.07 |

* cited by examiner

FIG. 6

AUTHENTICATION
MANAGEMENT TABLE

| TERMINAL ID | PASSWORD |
|---|---|
| 01aa | aaaa |
| 01ab | abab |
| 01ba | baba |
| ... | ... |

FIG. 7

TERMINAL MANAGEMENT TABLE

| TERMINAL ID | NAME | OPERATION STATE | IP ADDRESS |
|---|---|---|---|
| 01aa | COMPANY X, BRANCH a, GROUP a | ON LINE | 1.2.1.3 |
| ... | ... | ... | ... |
| 01ba | COMPANY X, BRANCH b, GROUP a | ON LINE | 1.2.2.3 |
| ... | ... | ... | ... |
| 01db | COMPANY Y, BRANCH d, GROUP b | OFF LINE | 1.4.2.4 |

FIG. 8

CANDIDATE LIST MANAGEMENT TABLE

| REQUEST TERMINAL ID | COUNTERPART TERMINAL ID |
|---|---|
| 01aa | 01ab,01ac,···,01db |
| ... | ... |
| 01ac | 01aa,01ab |
| ... | ... |
| 01db | 01aa,··· |

FIG. 9

SESSION MANAGEMENT TABLE

| SESSION ID | RELAY DEVICE ID | TERMINAL ID |
|---|---|---|
| se01 | 111a | 01aa, 01ab |
| se02 | 111b | 01bd |
| se03 | 111c | 01ae, 01dc |
| ... | ... | ... |

FIG. 10

GROUP DATA MANAGEMENT TABLE

| GROUP ID | REGISTERED MEMBER TERMINAL ID | TENTATIVE REGISTERED MEMBER TERMINAL ID | USER TERMINAL ID | DATE/TIME REGISTERED |
|---|---|---|---|---|
| GROUP 01 | 01ab, 01ac | 01ca | 01aa | 2013/7/2 9:52 |
| GROUP 02 | 01ac, 01ae |  | 01ae | 2013/7/4 15:17 |
| ... | ... | ... | ... | ... |

FIG. 22

GROUP DATA MANAGEMENT TABLE

| GROUP ID | REGISTERED MEMBER TERMINAL ID | TENTATIVE REGISTERED MEMBER TERMINAL ID | USER TERMINAL ID | DATE/TIME REGISTERED |
|---|---|---|---|---|
| GROUP 01 | 01ab | 01ca | 01aa | 2013/7/2 9:52 |
| GROUP 02 | 01ac, 01ae |  | 01ae | 2013/7/4 15:17 |
| GROUP 03 | 01ab, 01ac |  | 01aa | 2013/7/5 11:08 |
| ... | ... | ... | ... | ... |

FIG. 23

GROUP DATA MANAGEMENT TABLE

| GROUP ID | REGISTERED MEMBER TERMINAL ID | TENTATIVE REGISTERED MEMBER TERMINAL ID | USER TERMINAL ID | DATE/TIME REGISTERED |
|---|---|---|---|---|
| GROUP 01 | 01ab | 01ca | 01aa | 2013/7/2 9:52 |
| GROUP 02 | 01ac, 01ae |  | 01ae | 2013/7/4 15:17 |
| GROUP 03 | 01ab, 01ac | 01ad, 01ae | 01aa | 2013/7/5 11:08 |
| ... | ... | ... | ... | ... |

COMMUNICATION MANAGEMENT SYSTEM, COMMUNICATION TERMINAL, COMMUNICATION SYSTEM, AND RECORDING MEDIUM

CROSS-REFERENCE TO RELATED APPLICATIONS

This patent application is based on and claims priority pursuant to 35 U.S.C. §119(a) to Japanese Patent Application No. 2013-155524, filed on Jul. 26, 2013, in the Japan Patent Office, the entire disclosure of which is hereby incorporated by reference herein.

BACKGROUND

Technical Field

The present invention generally relates to managing information regarding one or more candidate counterpart terminals for communication.

Description of the Related Art

With the need for reducing costs or times associated with business trips, more companies are moving towards communication systems to have communication among remotely located offices via a communication network such as the Internet or a leased line. For example, a videoconference system may be provided, in which contents data such as image data and sound data are transmitted or received among a plurality of videoconference terminals. Before starting communication, a user at a request communication terminal selects one or more counterpart communication terminals, for example, using a list of candidate counterpart communication terminals that is previously prepared. It has been, however, cumbersome to register one candidate counterpart communication terminal at a time.

SUMMARY

Example embodiments of the present invention include a communication management system, which manages session information regarding a contents data session being established to communicate contents data among a plurality of participating communication terminals, and receives a request for registering a group of the plurality of participating communication terminals that are currently participating in the session, from a first participating communication terminal of the plurality of participating communication terminals, during when the session is being established. In response to the request for registering, the communication management system stores first candidate information of the first participating communication terminal in a first memory, the first candidate information associating the group of the plurality of participating communication terminals with the first participating communication terminal.

Example embodiments of the present invention include a communication terminal, which receives a use input that requests for registering the group of the plurality of participating communication terminal, and sends the request for registering to the communication management system through a network.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 6 is an example data structure of an authentication management table, managed by the management system of FIG. 5;

FIG. 7 is an example data structure of a terminal management table, managed by the management system of FIG. 5;

FIG. 8 is an example data structure of a candidate list management table, managed by the management system of FIG. 5;

FIG. 9 is an example data structure of a session management table, managed by the management system of FIG. 5;

FIG. 10 is an example data structure of a group data management table, managed by the management system of FIG. 5;

FIG. 22 is an example data structure of group data management table; and

FIG. 23 is an example data structure of group data management table.

Figure 1:
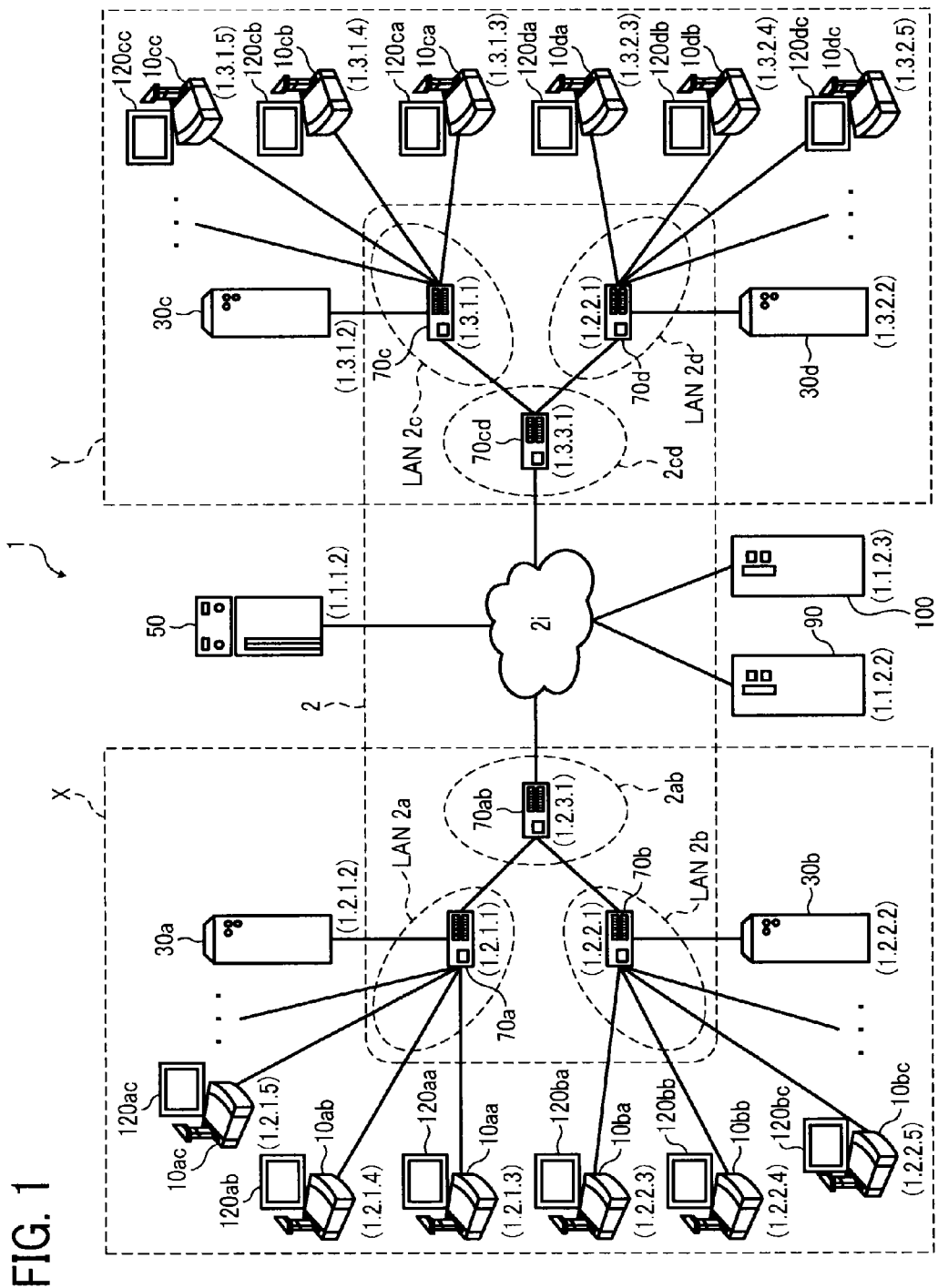
FIG. 1 is a schematic diagram illustrating a configuration of a communication system according to an example embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers or the like. These terms in general may be referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

FIG. 1 illustrates a configuration of the communication system 1. In the following examples, it is assumed that the communication system 1 of FIG. 1 is implemented as a communication system, which allows transmission of data or any information that reflects the feelings of a user, between or among a plurality of communication terminals 10 via a communication management system 50. Examples of the communication system include, but not limited to, a video communication system such as a videoconference system or a teleconference system.

In particular, in the following examples, it is assumed that the communication system 1 of FIG. 1 is implemented as the videoconference system, which is one example structure of the communication system. Based on this assumption, the communication management system 50 is implemented as the videoconference communication management system, which is one example structure of the communication management system. Further, the communication terminal 10 is implemented as the videoconference communication terminal, which is one example structure of the communication terminal. However, the use of communication system 1 is not limited to the following examples such that the communication system 1 may be implemented as any desired system other than the communication system described below.

The communication system 1 of FIG. 1 includes a plurality of communication terminals 10aa, 10ab, 10ac, 10ba, 10bb, 10bc, 10ca, 10cb, 10cc, 10da, 10db, and 10dc, a plurality of displays 120aa, 120ab, 120ac, 120ba, 120bb, 120bc, 120ca, 120cb, 120cc, 120da, 120db, and 120dc, a plurality of relay devices 30a, 30b, 30c, and 30d, the communication management system 50, a program providing system 90, and a maintenance system 100.

The communication terminal 10 transmits or receives contents data, such as image data and/or sound data, to or from another communication terminal 10. In this example, a moving image, a still image, or both of the still image and the moving image, may be transmitted as the image data. In the following examples, it is assumed that the moving image is transmitted.

For the descriptive purposes, in this example, any number of the plurality of communication terminals 10aa to 10dc may be collectively or each referred to as the terminal 10. Any number of the plurality of displays 120aa to 120dc may be collectively or each referred to as the display 120. Any one of the plurality of relay devices 30a, 30b, 30c, and 30d may be collectively or each referred to as the relay device 30. The communication management system 50 may be referred to as the "management system" 50.

The relay device 30 relays contents data, such as image data and/or sound data, between or among the plurality of terminals 10. The management system 50, which may be implemented by one or more computers to cooperatively function as a computer system, centrally manages various information such as login information of the terminal 10, the communication state of the terminal 10, candidate list information, and the communication state of the relay device 30.

The communication system 1 further includes a plurality of routers 70a, 70b, 70c, 70d, 70ab, and 70cd, which may be collectively or each referred to as the router 70. The router 70 selects a route that is most suitable for transmitting contents data such as image data and sound data.

The program providing system 90 includes a hard disk device (HD) 204 (FIG. 4), which stores a terminal control program that causes the terminal 10 to perform various functions or operations. For example, the program providing system 90 sends the terminal control program to the terminal 10 through the Internet 2i to cause the terminal 10 to install the terminal control program. Further, the HD 204 of the program providing system 90 may store a relay control program that causes the relay device 30 to perform various functions or operations. For example, the program providing system 90 sends the relay control program to the relay device 30 through the Internet 2i to cause the relay device 30 to install the relay control program. Further, the HD 204 of the program providing system 90 may store a communication management program that causes the management system 50 to perform various functions or operations. For example, the program providing system 90 sends the communication management program to the management system 50 to cause the management system 50 to install the communication management program.

The maintenance system 100 is a computer system, which may be implemented by one or more computers, to maintain, manage, fix, or upgrade at least one of the terminal 10, relay device 30, management system 50, and program providing system 90. Assuming that the maintenance system 100 is provided within a country, and the terminal 10, relay device 30, management system 50, and program providing system 90 are each installed outside the country, the maintenance system 100 maintains, manages, fixes, or upgrades at least one of the terminal 10, relay device 30, management system 50, and program providing system 90, remotely through the communications network 2. The maintenance system 100 may manage maintenance of at least one of the terminal 10, relay device 30, management system 50, and program providing system 90 without using the communications network 2. For example, a machine type number, a manufacturing number, customer information, maintenance and repair information, and failure log information may be maintained at the maintenance system 100 without using the communications network 2.

Still referring to FIG. 1, the terminals 10aa, 10ab, and 10ac, the relay device 30a, and the router 70a are connected to a local area network (LAN) 2a. The terminals 10ba, 10bb, and 10bc, the relay device 30b, and the router 70b are connected to a LAN 2b. The LAN 2a and the LAN 2b are connected to a leased line 2ab in which the router 70ab is provided. It is assumed that the LAN 2a, LAN 2b, and the leased line 2ab, are within a private network X. For example, assuming that the private network X is managed by Company X, the LAN 2a corresponds to a network managed by a branch office "a", and the LAN 2b corresponds to a network managed by a branch office "b".

The terminals 10ca, 10cb, and 10cc, the relay device 30c, and the router 70c are connected to a LAN 2c. The terminals 10da, 10db, and 10dc, the relay device 30d, and the router 70d are connected to a LAN 2d. The LAN 2c and the LAN 2d are connected to a leased line 2cd in which the router 70cd is provided. It is assumed that the LAN 2c, LAN 2d, and leased line 2cd, are within a private network Y other than the private network X. For example, assuming that the private network Y is managed by Company Y, the LAN 2c corresponds to a network managed by a branch office "c", and the LAN 2d corresponds to a network managed by a branch office "d". The network X and the network Y are connected through the Internet 2i, via the routers 70ab and 70cd.

The management system 50 and the program providing system 90 are connected through the Internet 2i to the terminal 10 and the relay device 30. The management system 50 is made communicable with the terminal 10 and the relay device 30 through the communications network 2. Any one of the management system 50 and the program providing system 90 may be located at any network location within or outside any one of the network X and the network Y.

In this example, the communications network 2 includes the LAN 2a, LAN 2b, leased line 2ab, Internet 2i, leased line 2cd, LAN 2c, and LAN 2d. Any one or any portion of these lines or any other lines that may be included in the communications network 2 may be implemented as wired network or wireless network such as Wireless Fidelity (WiFi) network or Bluetooth network.

As illustrated in FIG. 1, the terminal 10, the relay device 30, the management system 50, the router 70, the program providing system 90, and the maintenance system 100 are each provided with four digit numbers. These four digit numbers separated by dots are the simple expressions of IP addresses respectively assigned to any one of the devices shown in FIG. 1, each of which has a function of communication device. For example, the IP address of the terminal 10aa is "1.2.1.3". For simplicity, it is assumed that the IP address is expressed in IPv4. Alternatively, the IP address may be expressed in IPv6.

Further, in this example, the terminal 10 may be communicated in various ways, other than the example case in which the terminals 10 at different companies or different branch offices communicate with one another. For example, at least two different terminals 10 that are located at different rooms in the same office, or at least two different terminals 10 that are located at different offices that are remotely located from one another, may communicate with one another. In another example, at least two different terminals 10 that are located in the same room may communicate with one another. In another example, one terminal 10 that is located indoor and another terminal 10 that is located outdoor, or at least two different terminals 10 that are both located outdoor, may communicate with one another. When the terminal 10 is located outdoor, the terminal 10 communicates with the other terminal 10 through a wireless network such as a wireless network designed for a mobile phone.

<Hardware Structure of Communication System>

Figure 2:
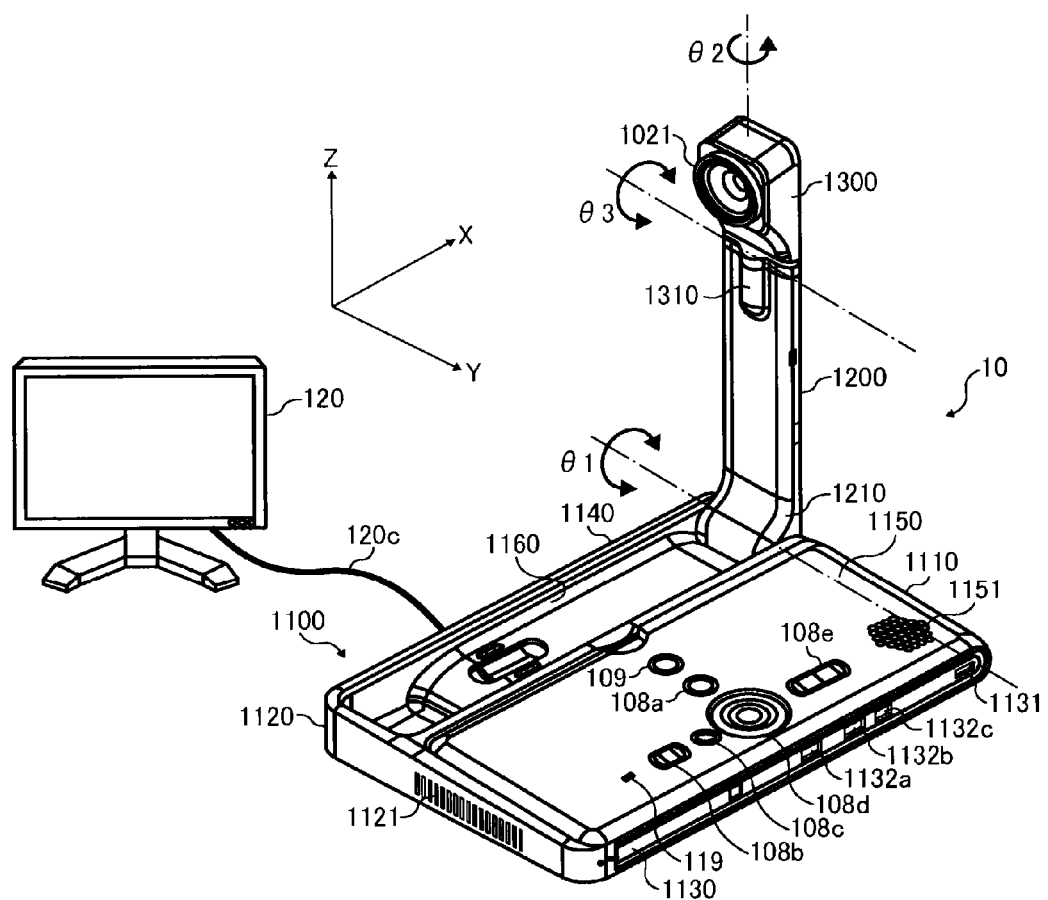
FIG. 2 is a perspective view illustrating the outer appearance of a communication terminal of the communication system of FIG. 1.
Figure 3:
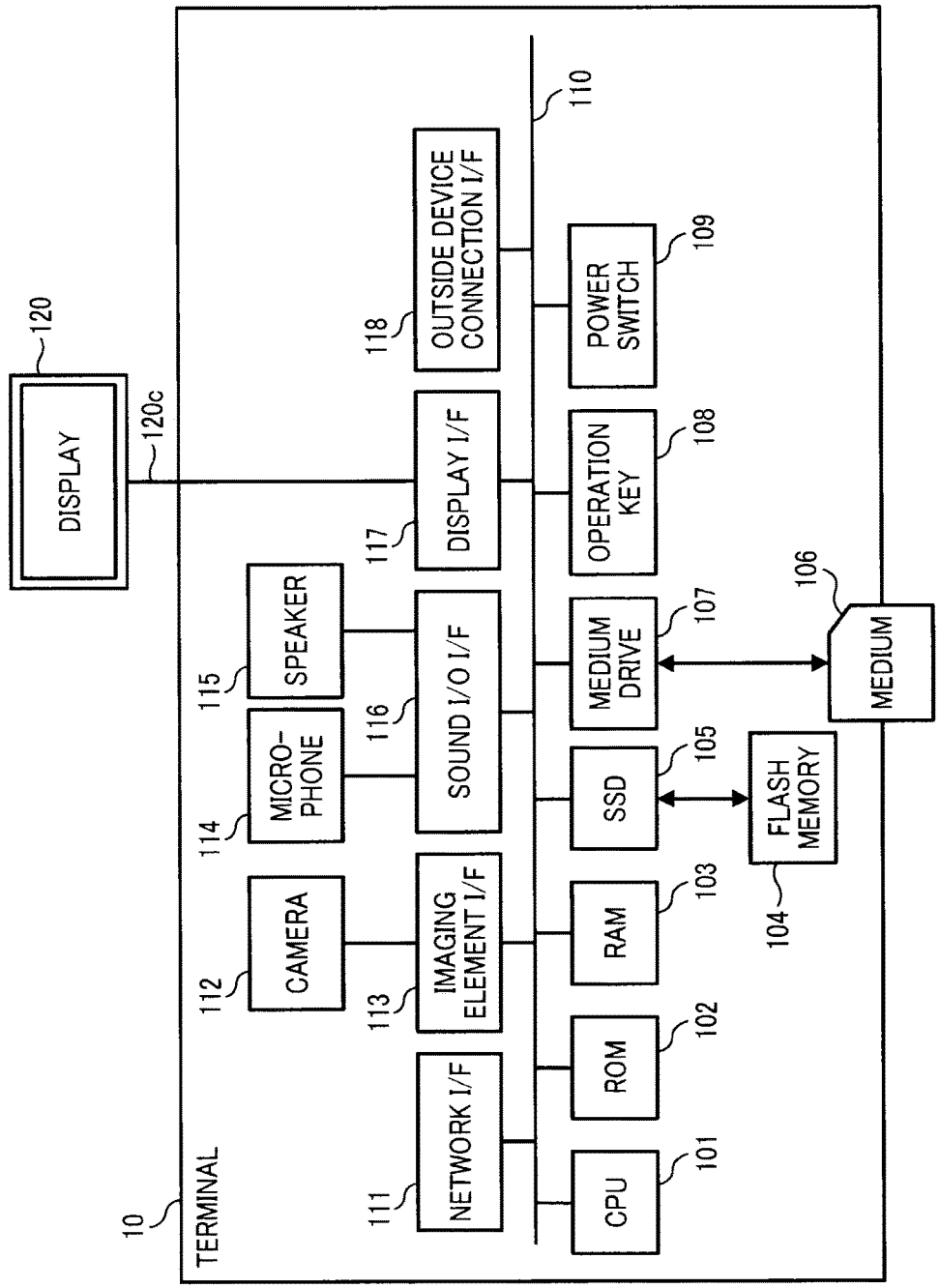
FIG. 3 is a schematic block diagram illustrating a hardware structure of the communication terminal of FIG. 2.

Referring now to FIGS. 2 and 3, a hardware structure of the terminal 10 is explained according to an example embodiment of the present invention.

FIG. 2 is a perspective view illustrating the outer appearance of the communication terminal 10 of the communication system 1 of FIG. 1. In FIG. 2, the longitudinal direction of the terminal 10 is referred to as X direction. The direction orthogonal to the X direction, which is the horizontal direction of the terminal 10, is referred to as the Y direction. The direction orthogonal to the X direction and the Y direction is referred to as the Z direction.

As illustrated in FIG. 2, the terminal 10 includes a body 1100, an arm 1200, and a camera housing 1300. The body 1100 includes a front side wall 1110 having a plurality of air intake holes that are formed over the nearly entire surface of the intake surface of the front side wall 1110. The body 1100 further includes a back side wall 1120 provided with an exhaust surface 1121 having a plurality of exhaust holes over the nearly entire surface of the exhaust surface 1121. When a cooling fan that is provided within the body 1100 is driven, air flows in through the intake holes of the intake surface and out through the exhaust holes of the exhaust surface 1121. The body 1100 further includes a right side wall 1130 formed with a sound pickup hole 1131. Through the sound pickup hole 1131, a microphone 114 (FIG. 3) of the terminal 10 is able to catch sounds such as human voice or any sound including noise.

The body 1100 has an operation panel 1150, which is provided at a front surface toward the right side wall 1130. The operation panel 1150 includes a plurality of operation keys 108a to 108e ("the operation key 108"), a power switch 109, an alarm lamp 119, and a plurality of sound output holes 1151. Through the sound output holes 1151, a speaker 115 (FIG. 3) of the terminal 10 is able to output sounds such as sounds generated based on human voice. The body 1100 further includes a holder 1160, which is provided at the front surface toward the left side wall 1140. The holder 1160, which has a concave shape, accommodates therein the arm 1200 and the camera housing 1300. The right side wall 1130 is further provided with a plurality of connection ports 1132a to 1132c ("connection ports 1132"). The connection ports 1132 allow electrical connection to an external device through an outside device connection I/F 118 (FIG. 3). The body 1100 further includes a left side wall 1140, which is provided with a connection port to connect the external display 120 to the display I/F 117 through a cable 120c.

The arm 1200 is attached to the body 1100 via a torque hinge 1210. With the torque hinge 1210, the arm 1200 can be rotated in directions of up and down with respect to the body, while making a tilt angle θ1 of up to 135 degrees. FIG. 2 illustrates the case where the tilt angle θ1 is 90 degrees.

The camera housing 1300 incorporates therein the camera 112 (FIG. 3) that takes an image of an object. The object may be a part of a user, document, or a room where the terminal 10 is located. The camera housing 1300 is provided with a torque hinge 1310. The camera housing 1300 is attached to the arm 1200 through the torque hinge 1310. With the torque hinge 1310, the camera housing 1300 can be rotated with respect to the arm 1200, in the direction of up, down, right, and left, such that the camera housing 1300 is kept at a desired position. More specifically, the camera housing 1300 can be rotated, while making a pan angle θ2 from about −180 degrees to 180 degrees in the direction right and left, and a tilt angle θ3 that ranges from about −45 degrees to +45 degrees in the direction of up and down. In FIG. 2, the pan angle θ2 and the tilt angle θ3 are each 0 degree.

The relay device 30, the management system 50, the program providing system 90, and the maintenance system 100 are each implemented by any desired number of general-purpose computers such as a personal computer or a server computer. For simplicity, explanation of the outer appearance of the computer is omitted.

FIG. 3 is a schematic block diagram illustrating a hardware structure of the communication terminal 10. As illustrated in FIG. 3, the terminal 10 includes a central processing unit (CPU) 101, a read only memory (ROM) 102, a random access memory (RAM) 103, a flash memory 104, a solid state drive (SSD) 105, a medium drive 107, the operation key 108, the power switch 109, a network interface (I/F) 111, the camera 112, an imaging element interface (I/F) 113, the microphone 114, the speaker 115, a sound input/output interface (I/O I/F) 116, the display interface (I/F) 117, and the outside device connection interface (I/F) 118, which are electrically connected through a bus 110 such as an address bus or data bus. The CPU 101 controls entire operation of the terminal 10. The ROM 102 stores therein a control program for execution by the CPU 101, such as an initial program loader (IPL). The RAM 103 functions as a work area for the CPU 101. The flash memory 104 stores therein various data such as the terminal control program, image data, or sound data such as voice data. The SSD 105 controls reading or writing of various data with respect to the flash memory 104 under control of the CPU 101. The medium drive 107 controls reading or writing of various data with respect to a removable recording medium 106 such as a flash memory. The operation key 108 allows the user to input a user instruction, for example, by allowing the user to select a communication destination such as the counterpart terminal 10. The power switch 109 allows the user to switch on or off the power of the terminal 10. The network I/F 111 allows the terminal 10 to transmit data through the communications network 2.

The camera 112 takes an image of an object to obtain image data under control of the CPU 101. The imaging element I/F 113 controls operation of the camera 112. The microphone 114 catches sounds such as voice of the user at the terminal 10. The speaker 115 outputs sounds such as sounds generated based on voice of the user at the counterpart terminal 10. The sound I/O I/F 116 controls input or output of sound signals such as voice signals with respect to the microphone 114 and the speaker 115 under control of the CPU 101. The display I/F 117 transmits image data to the display 120 under control of the CPU 101. The outside device connection I/F 118 controls connection of the terminal 10 to various types of outside device.

The display 120 may be implemented by a liquid crystal display (LCD) or an organic light emitting display, which displays various data such as an image of an object or an operation icon. As illustrated in FIGS. 2 and 3, the display 120 is connected to the display I/F 117 through the cable 120c. The cable 120c may be implemented by an analog RCB (VGA) signal cable, a component video cable, a high-definition multimedia interface (HDMI) signal cable, or a digital video interactive (DVI) signal cable.

The camera 112 includes a plurality of devices such as a lens system, and a solid-state image sensing device that photo-electrically converts a light to generate an image of an object. For example, the solid-state image sensing device includes a complementary metal oxide semiconductor (CMOS) or a charge coupled device (CCD).

The outside device connection I/F 118 may be connected to an outside device such as an external camera, external microphone, or external speaker through a universal serial bus (USB) cable that is connected through the port 1132 of the body 1100 (FIG. 2). When the external camera is connected to the terminal 10, the CPU 101 causes the terminal 10 to capture an image using the external camera, rather than the camera 112 that is incorporated in the terminal 10. When the external microphone or the external speaker is connected to the terminal 10, the CPU 101 causes the terminal 10 to use the external microphone or the external speaker in replace of the incorporated microphone 114 or the incorporated speaker 115.

The recording medium 106, which can be freely attached to or detached from the terminal 10, includes any desired type of recording medium. In alternative to the flash memory 104, any nonvolatile memory that is readable and writable under control of the CPU 101 may be used such as Electrically Erasable and Programmable ROM (EEPROM).

The terminal control program may be written onto a recording medium that is readable by a general-purpose computer such as the recording medium 106 in any format that is installable or executable by a general-purpose computer. Once the terminal control program is written onto the recording medium, the recording medium may be distributed. Further, the terminal control program may be stored in any desired memory other than the flash memory 104, such as the ROM 102.

Figure 4:
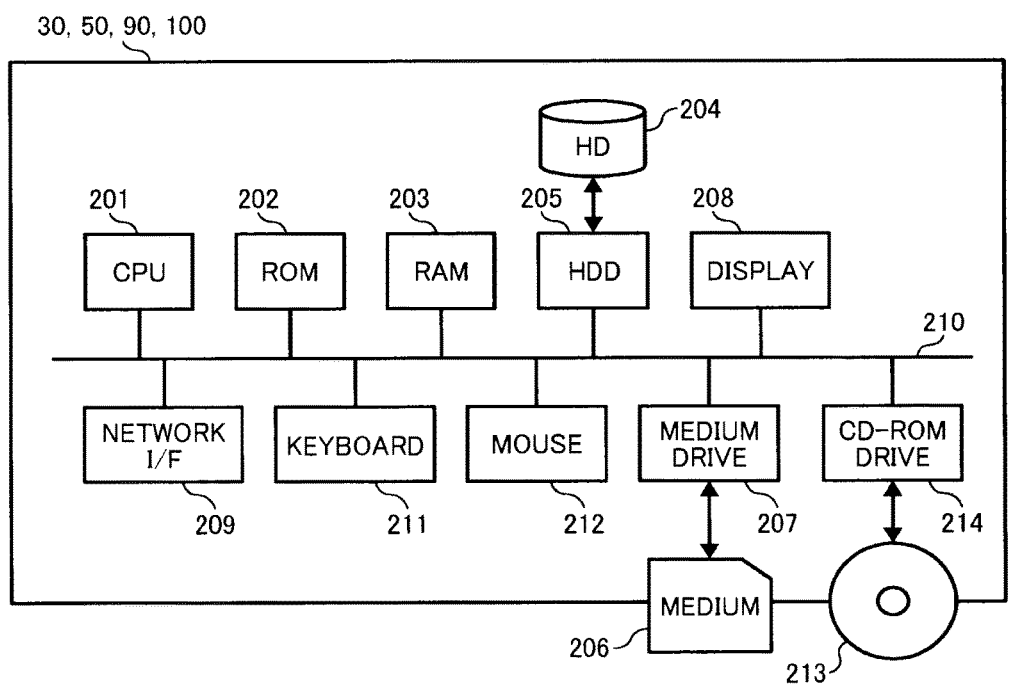
FIG. 4 is a schematic block diagram illustrating a hardware structure of any one of a management system, relay device, program providing system, and maintenance system, according to an example embodiment of the present invention.

FIG. 4 illustrates a hardware structure of the management system 50 of FIG. 1. The management system 50 includes a CPU 201, a ROM 202, a RAM 203, the HD 204, a hard disk drive (HDD) 205, a medium drive 207, a display 208, a network interface (I/F) 209, a keyboard 211, a mouse 212, and a CD-ROM drive 214, which are electrically connected through a bus 210 such as an address bus or a data bus.

The CPU 201 controls entire operation of the management system 50. The ROM 202 stores a control program for execution by the CPU 201, such as an IPL. The RAM 203 functions as a work area for the CPU 201. The HD 204 stores therein various data such as the communication management program. The HDD 205 controls reading or writing of various data with respect to the HD 204 under control of the CPU 201. The medium drive 207 controls reading or writing of various data with respect to a removable recording medium 206 such as a flash memory. The display 208 displays various data such as a cursor, menu, window, character, or image. The network I/F 209 allows the management system 50 to transmit data through the communications network 2. The keyboard 211 includes a plurality of keys, each of which is used for inputting a user instruction through a character, a numeral, or a symbol. The mouse 212 allows the user to input a user instruction including, for example, selection or execution of a specific instruction, selection of an area to be processed, and instruction of cursor movement. The CD-ROM drive 214 controls reading or writing of various data with respect to a CD-ROM 213. In alternative to the CD-ROM 213, any removable recording medium may be used.

The communication management program may be written onto a recording medium that is readable by a general-purpose computer such as the recording medium 206 or the CD-ROM 213 in any format that is installable or executable by a general-purpose computer. Once the communication management program is written onto the recording medium, the recording medium may be distributed. Further, the communication management program may be stored in any desired memory other than the HD 204, such as the ROM 202.

The relay device 30 is substantially similar in hardware structure to the management system 50 of FIG. 4, except for replacement of the management program with a relay device control program that is used for controlling the relay device 30. The relay device control program may be written onto a recording medium that is readable by a general-purpose computer such as the recording medium 206 or the CD-ROM 213 in any format that is installable or executable by the general-purpose computer. Once the relay device control program is written onto the recording medium, the recording medium may be distributed. Further, the relay device control program may be stored in any desired memory other than the HD 204, such as the ROM 202.

The program providing system 90 is substantially similar in hardware structure to the management system 50 of FIG. 4, except for replacement of the management program with a program providing program that is used for controlling the program providing system 90. The program providing program may be written onto a recording medium that is readable by a general-purpose computer such as the recording medium 206 or the CD-ROM 213 in any format that is installable or executable by the general-purpose computer. Once the program providing program is written onto the recording medium, the recording medium may be distributed. Further, the program providing program may be stored in any desired memory other than the HD 204, such as the ROM 202.

The maintenance system 100 is substantially similar in hardware structure to the management system 50 of FIG. 4, except for replacement of the management program with a maintenance program that is used for controlling the maintenance system 100. The maintenance program may be written onto a recording medium that is readable by a general-purpose computer such as the recording medium 206 or the CD-ROM 213 in any format that is installable or executable by the general-purpose computer. Once the maintenance program is written onto the recording medium, the recording medium may be distributed. Further, the maintenance program may be stored in any desired memory other than the HD 204, such as the ROM 202.

Other examples of removable recording medium, which may be used in replace of the CD-ROM 213, include, but not limited to, compact disc recordable (CD-R), digital versatile disk (DVD), and blue ray disc.

<Functional Structure of Communication System>

Figure 5:
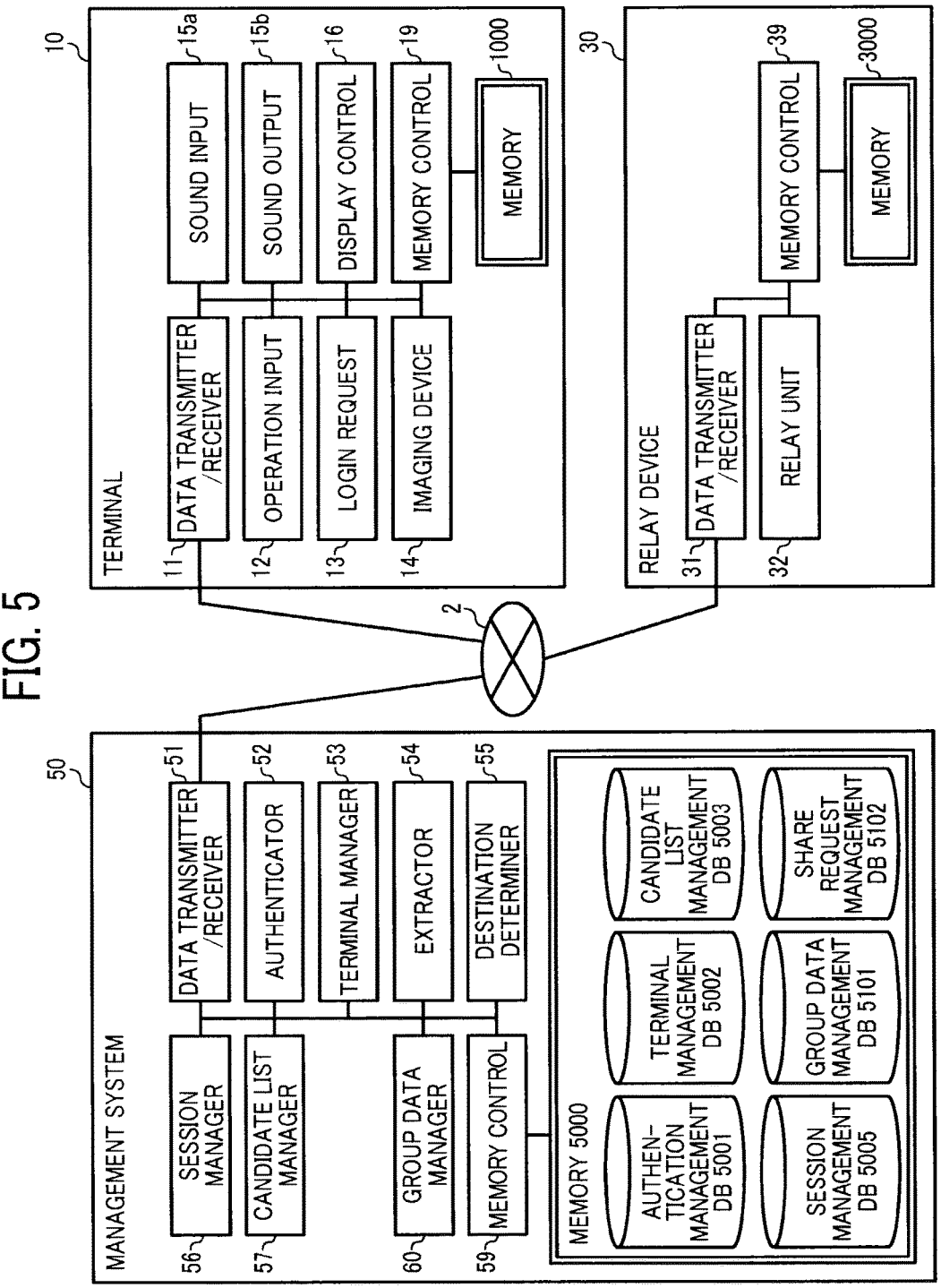
FIG. 5 is a schematic block diagram illustrating a functional structure of the communication terminal, the management system, and the relay device of the communication system of FIG. 1.

Next, a functional structure of the communication system 1 of FIG. 1 is explained according to an example embodiment of the present invention. FIG. 5 is a schematic block diagram illustrating a functional structure of the communication system 1 including the terminal 10, relay device 30, and management system 50. As illustrated in FIG. 5, the terminal 10, the relay device 30, and the management system 50 exchange data with one another through the communications network 2. In FIG. 5, the program providing system 90 and the maintenance system 100 of FIG. 1 are omitted.

<Functional Structure of Terminal>

The communication terminal 10 includes a data transmitter/receiver 11, an operation input 12, a login request 13, an imaging device 14, a sound input 15a, a sound output 15b, a display control 16, and a memory control 19. In this example, the operations or functions that are performed by the terminal 10, which include the operations or functions performed by the functional elements shown in FIG. 5, are performed in cooperation with one or more hardware devices of the terminal 10 that are shown in FIG. 3. More specifically, these elements shown in FIG. 5 correspond to a plurality of functions or functional modules, which are executed according to an instruction of the CPU 101 (FIG. 3) that is generated according to the program being loaded from the flash memory 104 onto the RAM 103. The terminal 10 further includes a memory 1000, which may be implemented by the RAM 103 or the flash memory 104 of FIG. 3.

The data transmitter/receiver 11 of the terminal 10, which may be implemented by the network I/F 111 (FIG. 3) under control of the CPU 101, transmits or receives various data or information to or from another terminal, device, or system, through the communications network 2.

The operation input 12 receives a user instruction input by the user through the operation key 108 or the power switch 109 (FIG. 3), under control of the instructions received from the CPU 101. For example, as the user turns on the power switch 109, the operation input 12 turns on the power of the terminal 10.

The operations or functions of the login request 13 are performed according to an instruction received from the CPU 101 (FIG. 3). When the power of the terminal 10 is turned on, the login request 13 automatically causes the data transmitter/receiver 11 to send login request information that requests the login process, and a current IP address of the terminal 10, to the management system 50 through the communications network 2. When the power of the terminal 10 is turned off according to a user instruction received from the user through the power switch 109, the login request 13 causes the data transmitter/receiver 11 to send current operation state information of the terminal 10 to the management system 50, which indicates that the power of the terminal 10 is turned off. After the operation state information is sent, the operation input 12 turns off the power of the terminal 10. As the operation state information of the terminal 10 is sent every time the power is turned off, the management system 50 is able to know that the terminal 10 is offline in realtime.

The operations or functions of the imaging device 14 of the terminal 10 are performed by the camera 112 and the imaging element I/F 113 according to an instruction received from the CPU 101 (FIG. 3). The imaging device 14 takes an image of an object to output image data of the object.

The operations or functions of the sound input 15a of the terminal 10 are performed by the sound I/O I/F 116 according to an instruction received from the CPU 101, in cooperation with the microphone 114. After the microphone 114 converts sounds of the user at the terminal 10 to a sound signal, the sound input 15a inputs the sound signal in the form of sound data for further processing. The operations or functions of the sound output 15b of the terminal 10 are performed by the sound I/O I/F 116 according to an instruction received from the CPU 101, in cooperation with the speaker 115. The sound output 15b outputs a sound signal of sound data that is received from the counterpart terminal 10 through the speaker 115.

The operations or functions of the display control 16 of the terminal 10 of FIG. 5 are performed by the display I/F 117 according to an instruction received from the CPU 101 (FIG. 3). The display control 16 controls transmit of image data to the display 120.

The memory control 19 is implemented by the SSD 105 of FIG. 3 according to an instruction received from the CPU 101. The memory control 19 stores various data in the memory 1000, or reads out various data from the memory 1000. The memory 1000 stores therein various data such as terminal identification (ID) information for identifying the terminal 10, and a password for authenticating a user at the terminal 10. The memory 1000 further stores therein image data and/or sound data that is received as the terminal 10 communicates with a counterpart terminal 10 such that the image data and/or sound data are overwritten. Before the image data is overwritten, an image generated based on the image data is displayed onto the display 120. Before the sound data is output, sounds generated based on the sound data is output through the speaker 115.

In this example, any one of the terminal ID of the terminal 10 and the relay device ID of the relay device 30 includes any type of identification information that can be expressed by any language, character, symbol, mark, or any combination of language, character, symbol, and mark.

<Functional Structure of Relay Device>

The relay device 30 includes a data transmitter/receiver 31, a relay unit 32, and a memory control 39. Upon execution, the CPU 201 (FIG. 4) loads the relay device control program from the HD 204 onto the RAM 203 to cause one or more of the units illustrated in FIG. 5 to perform functions or operations shown in FIG. 5. The relay device 30 further includes a memory 3000 that may be implemented by the HD 204 or RAM 203 (FIG. 4).

More specifically, in this example, the operations or functions that are performed by the relay device 30, which include the operations or functions performed by the units shown in FIG. 5, are performed in relation to one or more hardware devices of the relay device 30 that are shown in FIG. 4.

The data transmitter/receiver 31 of FIG. 5 is implemented by the network I/F 209 of FIG. 4 according to an instruction received from the CPU 201. The data transmitter/receiver 31 transmits or receives various data or information to or from another terminal, device, or system through the communication network 2.

The relay unit 32, which may be implemented by the instructions from the CPU 201, relays contents data to be transmitted or received between or among the terminals 10, through the data transmitter/receiver 31.

The memory control 39, which may be implemented by the instructions from the CPU 201 (FIG. 4) in cooperation with the HDD 205, stores or reads various data with respect to the memory 3000.

<Functional Structure of Management System>

The management system 50 includes a data transmitter/receiver 51, an authenticator 52, a terminal manager 53, an extractor 54, a destination determiner 55, a session manager 56, a candidate list manager 57, a group data manager 60, and a memory control 59. These units shown in FIG. 5 correspond to a plurality of functions or functional modules, which are executed according to an instruction of the CPU 201 (FIG. 4) that is generated according to the communication management program being loaded from the HD 204 onto the RAM 203. The management system 50 further includes a memory 5000, which may be implemented by the HD 204 (FIG. 4). The memory 500 stores various data or information.

(Authentication Management Table)

The memory 5000 includes an authentication management database (DB) 5001, which stores therein an authentication management table of FIG. 6. The authentication management table of FIG. 6 stores, for each one of the terminals 10 that are managed by the management system 50, the terminal ID and the password in association with each other. For example, referring to FIG. 6, the terminal 10aa has the terminal ID "01aa" and the password "aaaa".

(Terminal Management Table)

The memory 5000 further includes a terminal management DB 5002, which stores therein a terminal management table of FIG. 7. The terminal management table of FIG. 7 stores, for each one of the terminal IDs assigned to the terminals 10, the terminal name of the terminal 10, the operation state of the terminal 10, and the IP address of the terminal 10, in association with one another. For example, for the terminal 10aa having the terminal ID "01aa", the terminal management table of FIG. 7 indicates that the terminal name is "Company X, Branch a, Group a", the operation state is online ("ONLINE"), and the IP address of the terminal 10aa is "1.2.1.3".

(Candidate List Management Table)

The memory 5000 further includes a candidate list management DB 5003, which stores therein a candidate list management table of FIG. 8. The candidate list management table of FIG. 8 stores, for each one of a plurality of request terminals 10 capable of requesting for videoconference communication, the terminal ID of the request terminal 10, and one or more terminal IDs that are respectively assigned to candidate counterpart terminals 10 that are previously registered for the request terminal 10. In this example, for the request terminal 10, one or more terminals 10 of the communication system 1 of FIG. 1 are previously registered as the candidate counterpart terminal 10. For example, the candidate list management table of FIG. 8 indicates that the request terminal 10aa having the terminal ID "01aa" can request for videoconference with respect to the terminal 10ab having the terminal ID "01ab", the terminal 10ac having the terminal ID "01ac", and the terminal 10db having the terminal ID "01 db", etc. The management system 50 manages the candidate list management table of FIG. 8, for example, according to a user instruction received from any one of the terminals 10. For example, in response to a user instruction received from the terminal 10aa, the management system 50 may add or delete the contents of the candidate list management table of FIG. 8.

(Session Management Table)

The memory 5000 further includes a session management DB 5005, which stores therein a session management table of FIG. 9. The session management table of FIG. 9 includes, for each session ID that identifies a contents data session "sed" for transmitting or receiving contents data between a plurality of terminals 10, a relay device ID of the relay device to be used for transmitting or receiving contents data, and a terminal ID of each one of the plurality of terminals 10 participating in the contents data session "sed". For example, the session management table of FIG. 9 indicates that, for the contents data session "sed" having the session ID "se03", the relay device 30c having the relay device ID "111c" relays contents data between the terminal 10ae with the terminal ID "01ae" and the terminal 10dc with the terminal ID "01dc".

(Group Data Management Table)

The memory 5000 further includes a group data management DB 5101, which stores therein a group data management table of FIG. 10. The group data management table of FIG. 10 stores, for each group, various group information such as a group ID, a member terminal ID, and a user terminal ID, in association with one another. The group ID is any identification information that identifies a specific group. The member terminal ID is a terminal ID that identifies each one of the terminals 10 ("member terminal") belonging to the specific group. The member terminal ID is classified into a registered member terminal ID of a registered member terminal, and a tentatively registered member terminal ID of a tentatively registered member terminal. The registered terminal is a terminal 10 that is confirmed as a member terminal of a specific group, based on determination that the terminal is registered as a candidate counterpart terminal for the user terminal 10. The tentatively registered member terminal is a terminal 10 that is not confirmed as a member terminal of a specific group based on determination that the terminal is not registered as a candidate counterpart terminal for the user terminal 10, but tentatively registered to the group data management table as a candidate counterpart terminal for the user terminal 10. The user terminal ID is a terminal ID that identifies the terminal 10, which is capable of using the group information such as a group member list that lists a group of member terminals. For example, the group data management table of FIG. 10 indicates that, for the group identified by the group ID "0002", the member terminals include the terminal 10ac having the terminal ID "01ac" and the terminal 10ae having the terminal ID "01ae", and that the terminal 10ae is capable of using the group member list.

(Functional Structure of Management System)

Referring back to FIG. 5, the data transmitter/receiver 51, which may be implemented by the network I/F 209 (FIG. 4) according to an instruction received from the CPU 201, transmits or receives various data or information to or from another terminal, device, or system through the communications network 2.

The authenticator 52, which may be implemented by the instructions from the CPU 201 (FIG. 4), obtains a terminal ID and a password from the login request information that is received from the data transmitter/receiver 51. Using the terminal ID and the password as a search key, the terminal authenticator 52 searches the authentication management DB 5001 (FIG. 6) to determine whether the obtained set of terminal ID and password is registered. Based on the search result, the terminal authenticator 52 determines whether the user at the terminal 10 or the terminal 10 is allowed for access.

The terminal manager 53, which may be implemented by the instructions from the CPU 201 (FIG. 4), manages the operation state of the request terminal 10 that sends the login request information using the terminal management DB 5002 (FIG. 7). More specifically, the terminal manager 53 stores the terminal ID of the request terminal 10, the operation state of the request terminal 10, and the IP address of the request terminal 10, in association with one another. When the power switch 109 is changed from the "ON" state to the "OFF" state by the user, the terminal manager 53 receives the operation state information indicating that the power is turned off from the terminal 10, and changes the operation state of the terminal 10 from the "online" state to the "offline" state in the terminal management table of FIG. 7.

The extractor 54, which may be implemented by the instructions received from the CPU 201 (FIG. 4), extracts various information from the memory 5000.

The destination determiner 55, which may be implemented by the instructions from the CPU 201 (FIG. 4), determines whether the terminal ID of the terminal 10 participating in the contents data session "sed" matches the terminal ID of the candidate counterpart terminal 10 that can be selected by the terminal 10, and determines the items to be checked with the terminal 10 before registering the terminal 10 to a specific group.

The session manager 56, which may be implemented by the instructions received from the CPU 201 (FIG. 4), generates a session ID that identifies a contents data session "sed", when the contents data session "sed" is newly established between the terminals 10. The session manager 56 further manages various data in the session management table of FIG. 9, for example, to store the session ID, the terminal ID, and the relay device, in association with one another when the session is established.

The candidate list manager 57, which may be implemented by the instructions from the CPU 201 (FIG. 4), adds or deletes the candidate counterpart terminal ID that is to be associated with the request terminal ID, to or from the candidate list management DB 5003 (FIG. 8).

The group data manager 60, which may be implemented by the instructions from the CPU 201, manages various information regarding one or more groups using the group data management table (FIG. 10). More specifically, the group data manager 60 may add or delete, to or from each record, group information such as the group ID, member terminal ID, and user terminal ID.

The memory control 59, which operates according to an instruction received from the CPU 201 (FIG. 4) in cooperation with the HDD 205 (FIG. 4), stores various data in the memory 5000 or read out various data from the memory 5000.

<Operation>

Figure 11:
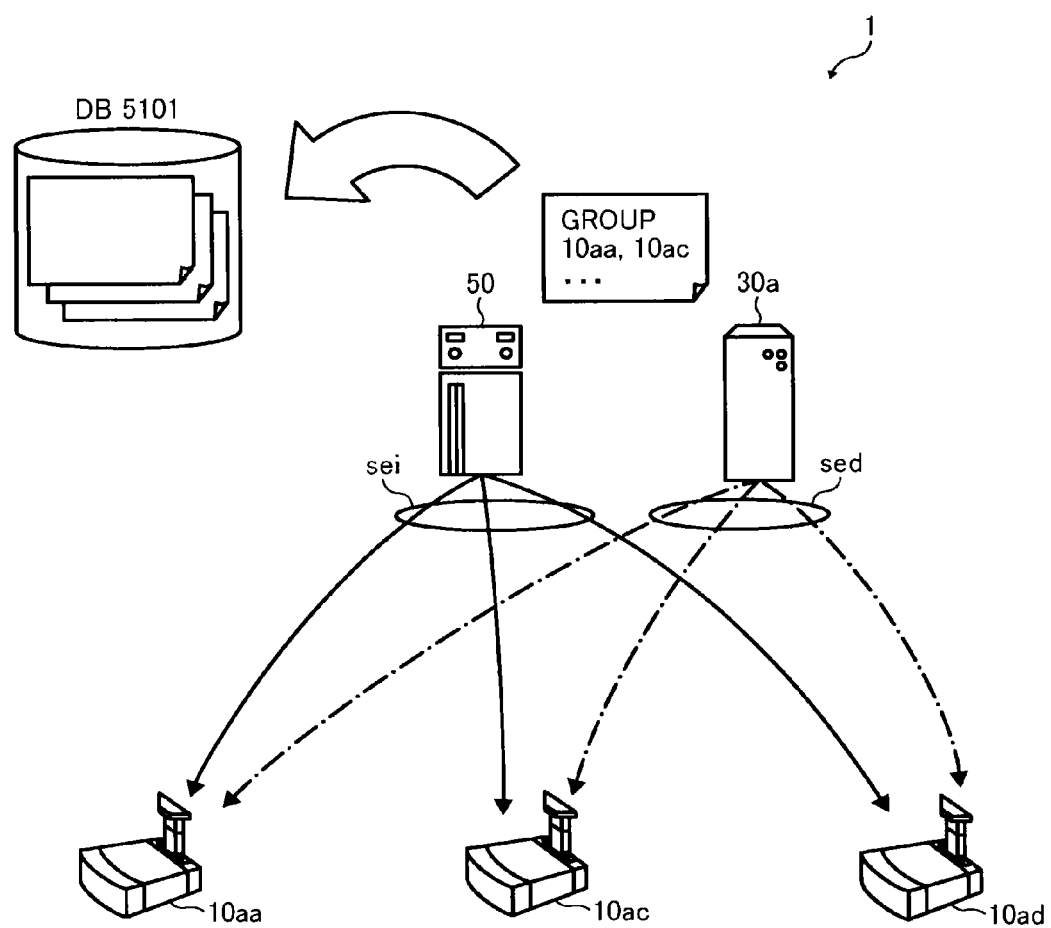
FIG. 11 is an illustration for explaining operation of transmitting or receiving various data, performed by the communication system of FIG. 1.

Referring to FIG. 11, operation of transmitting or receiving various data, performed by the communication system 1, is explained according to an example embodiment of the present invention.

As illustrated in FIG. 11, in the communication system 1, each one of the terminals 10aa, 10ac, and 10ad establishes a management data session "sei" with the management system 50, to transmit or receive various data. With this configuration, the management system 50 centrally manages the terminals 10 and the relay device 30.

Each one of the terminals 10aa, 10ac, and 10ad establishes a contents data session "sed" with the relay device 30, to transmit or receive contents data such as image data and zsound data. With this configuration, the terminal 10 transmits or receives contents data such as image data and sound data to or from another terminal 10. Alternatively, only sound data may be transmitted or received as contents data.

The group data management DB 5101 of the management system 50 stores group information, such as a list of member terminal IDs (group member list) each identifying a member terminal 10 belonging to a specific group. Assuming that a contents data session "sed" is established to transmit or receive data among the terminals 10, the data transmitter/receiver 51 of the management system 50 receives a request from one of the terminals 10 that are participating in the session (in this example, the terminal 10aa), which requests for registering information regarding a group including the terminals 10 that are participating in the session.

In response to the request, the session manager 56 obtains the terminal ID of each one of the terminals 10 that are participating in the contents data session "sed", from the session management DB 5005.

The group data management DB 5101 of the management system 50 stores a list of terminal IDs of the terminals 10 that are participating in the session, which are obtained at the session manager 56. In this manner, the user at the terminal 10aa does not have to select each one of the terminals 10, in case the user wants to start communication with the users at the terminals 10 that have been participating in the session even after ending the session.

Further, the user at the request terminal 10aa is able to determine to register the participating terminals 10, while having communication with the participating terminals 10. Since the user is able to check the contents data, such as image data and/or sound data relating to the user at the participating terminal, the user at the request terminal 10aa is able to instantly know the participating terminals to be registered. This suppresses the occurrence of an error in registering a terminal that is not intended by the user, due to the error in selecting a terminal by the user.

The candidate list management DB 5003 of the management system 50 stores candidate information, such as a list of candidate counterpart terminal IDs of candidate counterpart terminals each of which may be selected by the request terminal 10 (in this example, the terminal 10aa).

The group data management DB 5101 stores a group member list, which includes one or more participating terminals 10 that are participating in the session, but excluding the terminals 10 that are not registered as a candidate counterpart terminal for the request terminal 10aa. Since the unregistered participating terminal 10, which cannot be selected by the request terminal 10aa for communication, is not registered, the user at the request terminal 10aa is able to easily select one of the candidate counterpart terminals using the group member list, without any consideration of whether the terminal in the group member list can be selected by the request terminal 10aa.

In one example, the data transmitter/receiver 51 of the management system 50 receives approval information indicating approval to register the unregistered participating terminal 10 as a candidate counterpart terminal for the request terminal 10aa, from the unregistered participating terminal 10. Based on the approval information, the candidate list management DB 5003 stores the terminal ID of the unregistered participating terminal 10, in association with the request terminal ID of the request terminal 10aa. Based on registration of the unregistered participating terminal 10, the group data management DB 5101 updates group information, so as to additionally register the participating terminal that is newly registered, as a member terminal in the group. The user at the request terminal 10aa is able to select the terminal 10, which is newly registered as a candidate counterpart terminal for the request terminal 10aa, using the group member list.

In one example, the group data management DB 5101 at least temporarily stores a list of terminal IDs of unregistered participating terminals, as a tentatively registered member terminal for the group. The group data manager 60 updates the list of terminal IDs of tentatively registered member terminals, which is managed using the group data management DB 5101. For example, the data transmitter/receiver 51 of the management system 50 receives information indicating not to approve registration of the unregistered participating terminal as a candidate counterpart terminal for the request terminal 10aa. Based on the information indicating not to approve, the group data manager 60 deletes the terminal ID of the unregistered member terminal 10, from the list of the tentatively registered member terminals in the group data management DB 5101. As the tentatively registered member terminal is deleted, the group information stored in the group data management DB 5101 can be confirmed.

In one example, when a predetermined time elapses after registering the group information, such as after when information regarding the tentatively registered member terminal is stored, the group data manager 60 deletes the information regarding the tentatively registered member terminal. As the tentatively registered member terminal is deleted, the group information stored in the group data management DB 5101 can be confirmed.

In one example, the operation input 12 of the request terminal 10aa receives a request for registering the participating terminal 10 that is participating in the contents data session "sed", as a member terminal of a specific group. The data transmitter/receiver 11 of the request terminal 10aa transmits a request for registering the group information, to the management system 50.

In one example, the operation input 12 of the unregistered participating terminal 10 receives a user instruction indicating whether to approve or not to approve to register the unregistered participating terminal 10 as a candidate counterpart terminal for the request terminal 10aa. The data transmitter/receiver 11 of the unregistered participating terminal 10 transmits information indicating whether to approve or not approve, to the management system 50.

Figure 12:
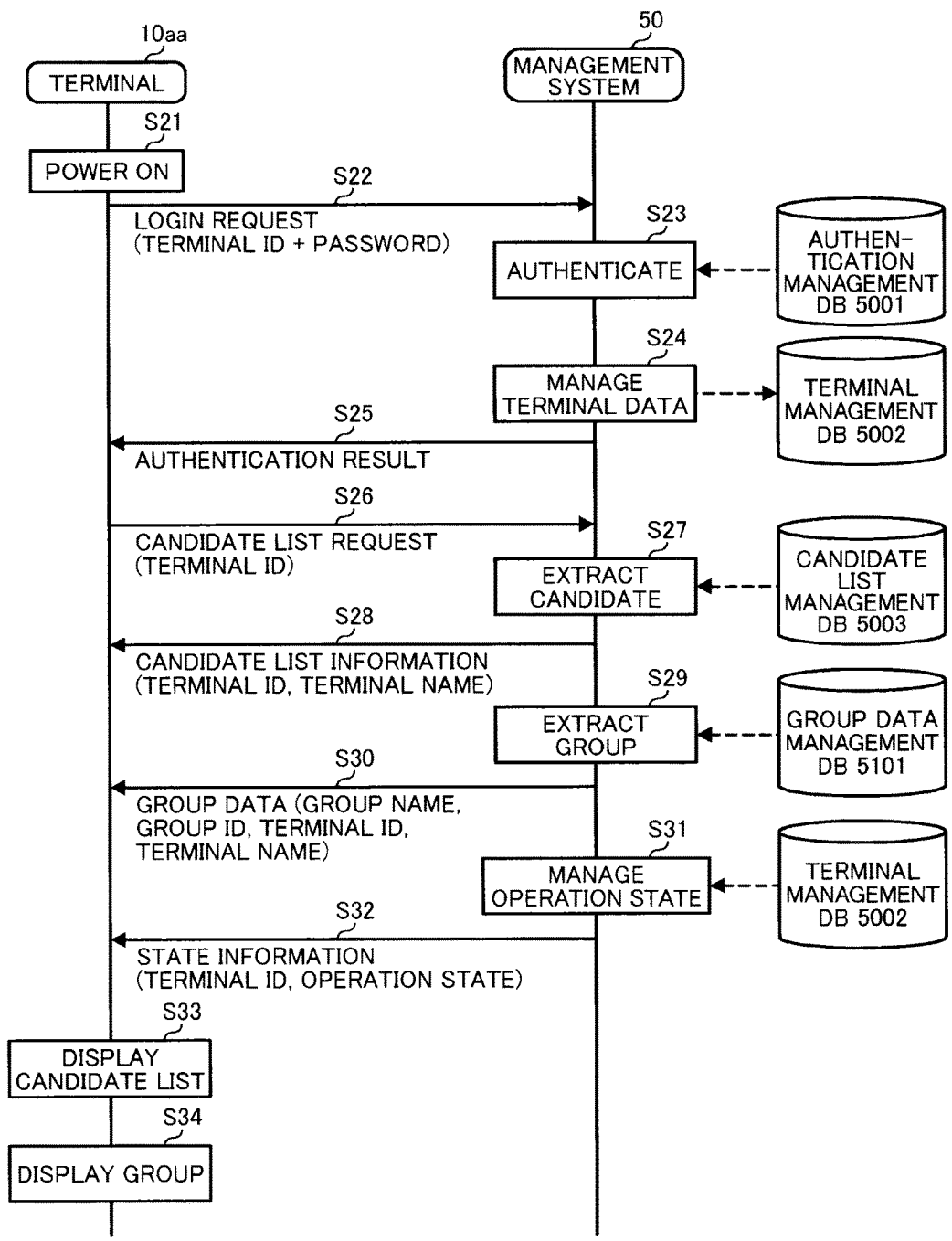
FIG. 12 is a data sequence diagram illustrating operation of preparing for communication, performed by the communication system of FIG. 1, according to an example embodiment of the present invention.

Referring now to FIGS. 12 to 23, operation of managing group information such as a group member list is explained according to an example embodiment of the present invention. FIG. 12 is a data sequence diagram illustrating operation of transmitting or receiving various data in preparation for starting communication by the terminal 10aa, according to an example embodiment of the present invention. In FIG. 12, various management data is transmitted or received through the management data session "sei" of FIG. 11.

At S21, as the user at the terminal 10aa turns on the power switch 109 (FIG. 3), the operation input 12 (FIG. 5) of the terminal 10aa receives an instruction for turning on the power, and turns on the power of the terminal 10aa.

In response to turning on the power, at S22, the login request 13 automatically transmits login request information, which requests for logging in the management system 50, through the data transmitter/receiver 11 via the communications network 2. The login request information includes the terminal ID that identifies the request terminal 10aa, and the password associated with the terminal ID. The terminal ID and the password may be obtained by the memory control 19 from the memory 1000, and sent to the data transmitter/receiver 11. At the time of sending the login request information from the request terminal 10aa to the management system 50, the request terminal 10aa sends an IP address of the request terminal 10aa such that the management system 50 knows the IP address of the request terminal 10aa.

At S23, the authenticator 52 of the management system 50 searches the authentication management DB 5001 (FIG. 6) stored in the memory 5000 using the terminal ID and the password of the login request information received through the data transmitter/receiver 51. When it is determined that the terminal ID and the password of the login request information is stored in the authentication management DB 5001, the authenticator 52 determines that the terminal 10aa is authenticated.

At S24, when the authenticator 52 authenticates that the login request information is received from the authenticated terminal 10, the terminal manager 53 of the management system 50 stores the operation state and the IP address of the terminal 10aa, in association with the terminal ID and the terminal name in the terminal management DB 5002 (FIG. 7) to create a record of the terminal 10aa. The terminal management table of FIG. 7 is able to manage the operation state "online" and the IP address "1.2.1.3" in association with the terminal ID "01aa".

At S25, the data transmitter/receiver 51 of the management system 50 sends the authentication result obtained by the authenticator 52 to the request terminal 10aa that has sent the login request information through the communications network 2. As described above, in this example, it is assumed that the authenticator 52 determines that the terminal 10aa is an authenticated terminal.

In response to receiving the authentication result indicating that the terminal 10aa is an authenticated terminal, at S26, the data transmitter/receiver 11 of the request terminal 10aa sends candidate list request information ("candidate list request") to the management system 50 through the communications network 2. The candidate list request information includes the terminal ID of the request terminal 10aa, and indicates to request for a candidate list. The management system 50 receives the candidate list request at the data transmitter/receiver 51.

At S27, the extractor 54 of the management system 50 searches the candidate list management table of FIG. 8 using the terminal ID "01aa" of the terminal 10aa as a search key to obtain a candidate terminal ID of each one of one or more candidate counterpart terminals 10 that can be selected by the request terminal 10aa. The extractor 54 further searches the terminal management table of FIG. 7 using the candidate counterpart terminal ID of each one of the candidate counterpart terminals 10, to obtain the name of each one of the candidate counterpart terminals 10.

At S28, the data transmitter/receiver 51 of the management system 50 transmits candidate list information ("candidate list"), which includes the terminal IDs and the terminal names of the candidate counterpart terminals 10, which are extracted at the extractor 54.

At S29, the extractor 54 of the management system 50 searches the group data management table of FIG. 10 using the terminal ID "01aa" of the request terminal 10aa as a search key to obtain group information regarding one or more groups that can be used by the terminal 10aa. The group information includes, for each group, a group ID, a registered member terminal ID, and a tentatively registered member terminal ID. The extractor 54 searches the terminal management table of FIG. 7 using the registered member terminal ID and the tentatively registered member terminal ID, as a search key, to obtain the terminal name of the member terminal for each one of the registered and tentatively registered member terminals 10.

At S30, the data transmitter/receiver 51 of the management system 50 transmits the group information including, for each group that can be used by the request terminal 10aa, the group ID, the terminal ID of each one of the (registered and tentatively registered) member terminals 10, and the name of each one of the (registered and tentatively registered) member terminals 10, to the request terminal 10aa.

At S31, the extractor 54 of the management system 50 further searches the terminal management table of FIG. 7, stored in the terminal management DB 5002, using the candidate counterpart terminal ID of each one of the candidate counterpart terminals, which are extracted at S27, to obtain the operation state of each one of the candidate counterpart terminals 10.

At S32, the data transmitter/receiver 51 of the management system 50 sends the terminal state information to the request terminal 10aa through the communications network 2, which includes the terminal ID and the operation state of each one of the candidate counterpart terminals 10.

Figure 13:
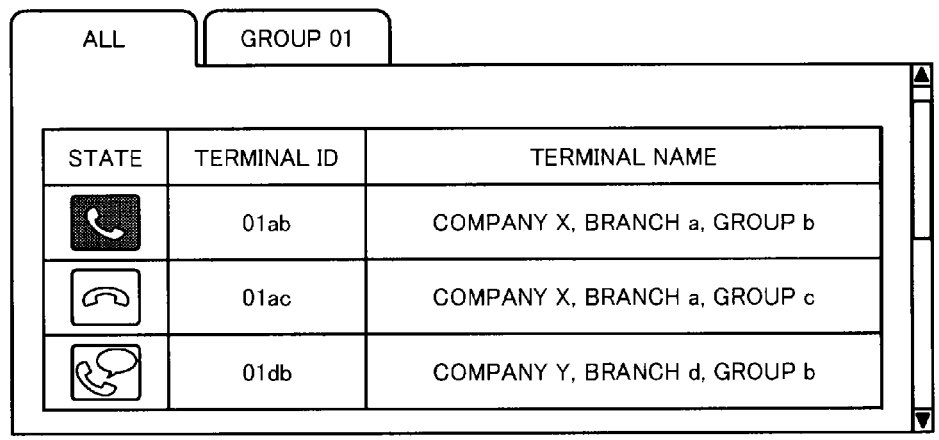
FIG. 13 is an example screen of a candidate list table.

At S33, the display control 16 of the request terminal 10aa causes the display 120 to display a candidate list, which reflects the terminal name and the operation state of each one of the candidate counterpart terminals 10, based on the candidate list information and the terminal state information that are respectively received at the data transmitter/receiver 11. FIG. 13 illustrates an example screen of a candidate list. The candidate list screen of FIG. 13 displays an icon reflecting the operation state of the candidate counterpart terminal 10, for each one of the candidate counterpart terminals 10. More specifically, in this example, the icon for the terminal 10ab indicates that the terminal 10ab is "online", the icon for the terminal 10ac indicates that the terminal 10ac is "offline", and the icon for the terminal 10db indicates that the terminal 10db is communicating.

Figure 14:
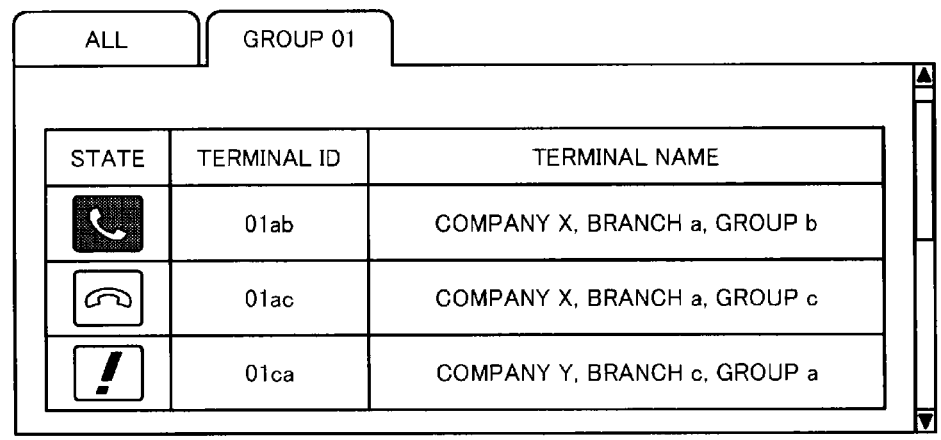
FIG. 14 is an example screen of a group member list.

At S34, the display control 16 of the request terminal 10aa further causes the display 120 to display a group member list, which reflects the terminal name and the operation state of each one of the (registered and tentatively registered) member terminals 10, based on the group information and the terminal state information that are respectively received at the data transmitter/receiver 11. FIG. 14 illustrates an example screen of a group member list. The group member list of FIG. 14 displays an icon reflecting the operation state of the member terminal 10, for each one of the member terminals 10. More specifically, in this example, the icon for the terminal 10ab indicates that the terminal 10ab is "online", the icon for the terminal 10ac indicates that the terminal 10ac is "offline", and the icon for the terminal 10ca indicates that the operation state of the terminal 10ca is unknown.

In this example, any one of the terminal 10ab and the terminal 10ac is the registered terminal, which is registered as a candidate counterpart terminal for the request terminal 10aa for communication, such that the operation state of the registered terminal is obtained at S31. In contrary, the terminal 10ca is tentatively registered to the group member list that can be used by the request terminal 10aa, but not registered as a candidate counterpart terminal 10 that can be selected by the request terminal 10aa for communication. Accordingly, the operation state of the unregistered terminal is not obtained at S31. Alternatively, the operation state of the unregistered terminal may be obtained, but not caused to be displayed through the screen. By not notifying the operation state of the tentatively registered member terminal 10ca, the security level improves.

Figure 15:
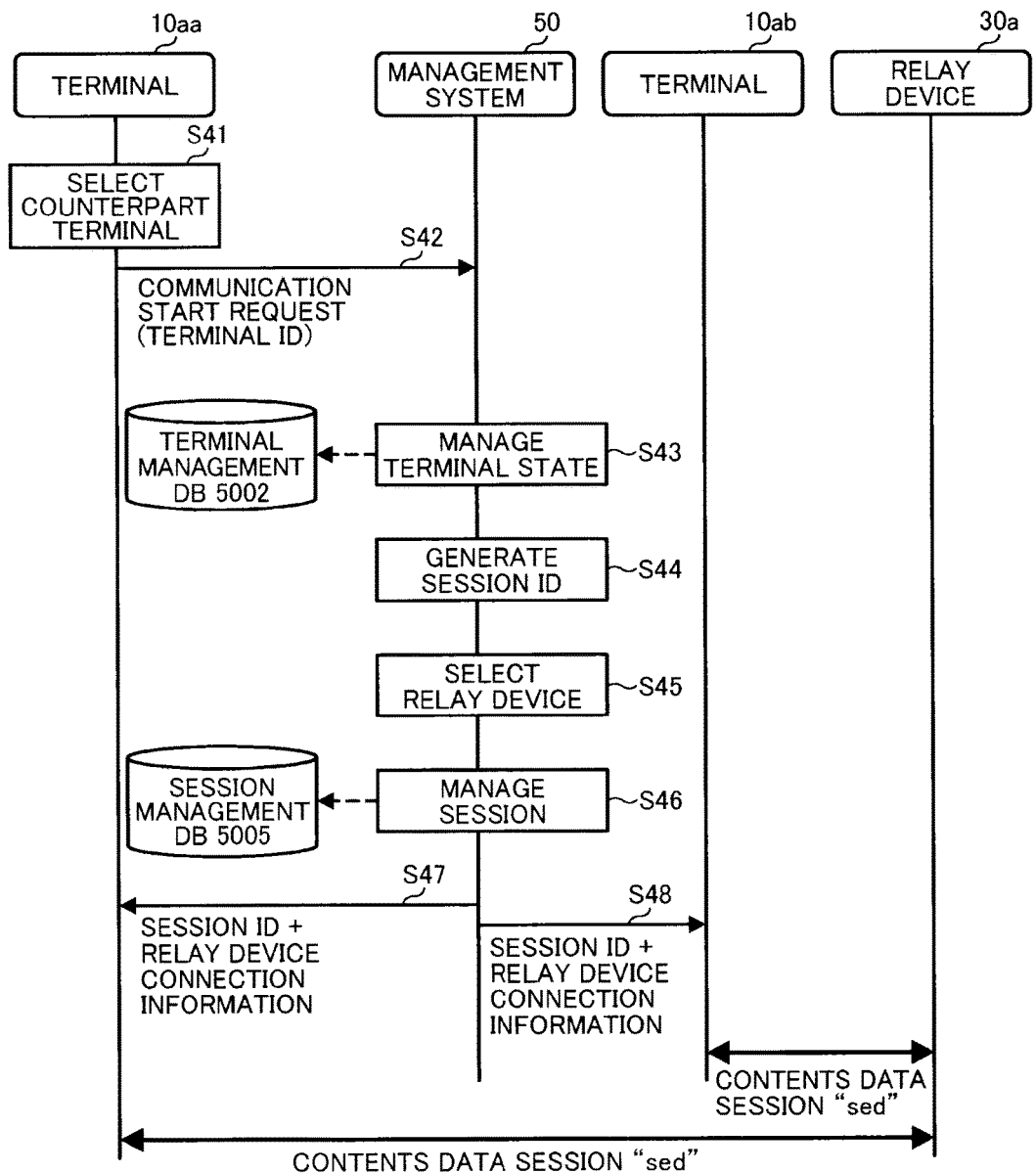
FIG. 15 is a data sequence diagram illustrating operation of establishing communication between or among a plurality of communication terminals, according to an example embodiment of the present invention.

Referring now to FIG. 15, operation of starting communication in response to the request from the request terminal 10aa is explained according to an example embodiment of the present invention.

As the user at the request terminal 10aa selects a counterpart terminal 10, from the candidate list of FIG. 13 or from the group member list of FIG. 14, using the operation key 108, at S41, the operation input 12 of the terminal 10aa receives a user instruction for selecting the counterpart terminal 10 to start communication with the counterpart terminal 10. In this example, it is assumed that the terminal 10ab is selected as the counterpart terminal 10.

At S42, the data transmitter/receiver 11 of the request terminal 10aa transmits communication start request information ("communication start request"), which requests to start communication with the counterpart terminal 10ab, to the management system 50. The communication start request includes the terminal ID "01aa" of the request terminal 10aa, and the terminal ID "01ab" of the counterpart terminal 10. The management system 50 receives the communication start request, which requests to start communication between the request terminal 10aa and the counterpart terminal 10ab, at the data transmitter/receiver 51.

At S43, the terminal manager 53 specifies records in the terminal management table of FIG. 7, using the terminal ID "01aa" of the request terminal 10aa and the terminal ID "01ab" of the counterpart terminal 10ab that are included in the communication start request, and changes the "operation state" data fields of the terminal 10aa and 10ab to "communicating".

At S44, the session manager 56 generates a session ID "se01", which identifies a contents data session "sed" to be established to communicate data between the request terminal 10aa and the counterpart terminal 10ab.

At S45, the session manager 56 selects a relay device 30, which is to relay contents data through the contents data session "sed" for the request terminal 10aa and the counterpart terminal 10ab, using any desired method. In this example, it is assumed that the relay device 30a is selected.

At S46, the session manager 56 may create a new record in the session management table of FIG. 9, with the newly generated session ID "se01". In association with the session ID "se01", the session manager 56 may store the request terminal ID "01aa" and the counterpart terminal ID "01ab", and the selected relay device ID "111a" of the selected relay device 30a, in association with one another.

At S47, the data transmitter/receiver 51 of the management system 50 transmits the session ID generated at the session manager 56 and relay device connection information to the request terminal 10aa, through the communications network 2. The relay device connection information includes, for example, an IP address of the relay device 30a, authentication information, and port number, which may be used by the request terminal 10aa to connect with the relay device 30a.

At S48, the data transmitter/receiver 51 of the management system 50 transmits the session ID generated at the session manager 56 and relay device connection information to the counterpart terminal 10ab, through the communications network 2. The relay device connection information includes, for example, an IP address of the relay device 30a, authentication information, and port number, which may be used by the counterpart terminal 10ab to connect with the relay device 30a.

With the relay device connection information, the request terminal 10aa establishes a contents data session "sed" having the session ID "se01", with the relay device 30a. The counterpart terminal 10ab establishes a contents data session "sed" having the session ID "se01", with the relay device 30a. Accordingly, the contents data session "sed" is established between the request terminal 10aa and the counterpart terminal 10ab to communicate contents data via the relay device 30a.

After establishing the contents data session "sed", the request terminal 10aa or the counterpart terminal 10ab, each participating in the session "se01", may request to start communication with any other terminal 10, in a substantially similar manner as described above referring to FIG. 15. Alternatively, any other terminal 10 may request the management system 50 to start communication with any one of the terminal 10aa and the terminal 10ab, in a substantially similar manner as described above referring to FIG. 15. In such case, the other terminal 10 may join in the communication being carried out by the request terminal 10aa and the counterpart terminal 10ab through the contents data session "sed" having the session ID "se01". When the other terminal 10 is joined, the session manager 56 of the management system 50 updates the session management table of FIG. 9 to additionally add the terminal ID of the terminal 10 that joins in the communication.

Figure 16:
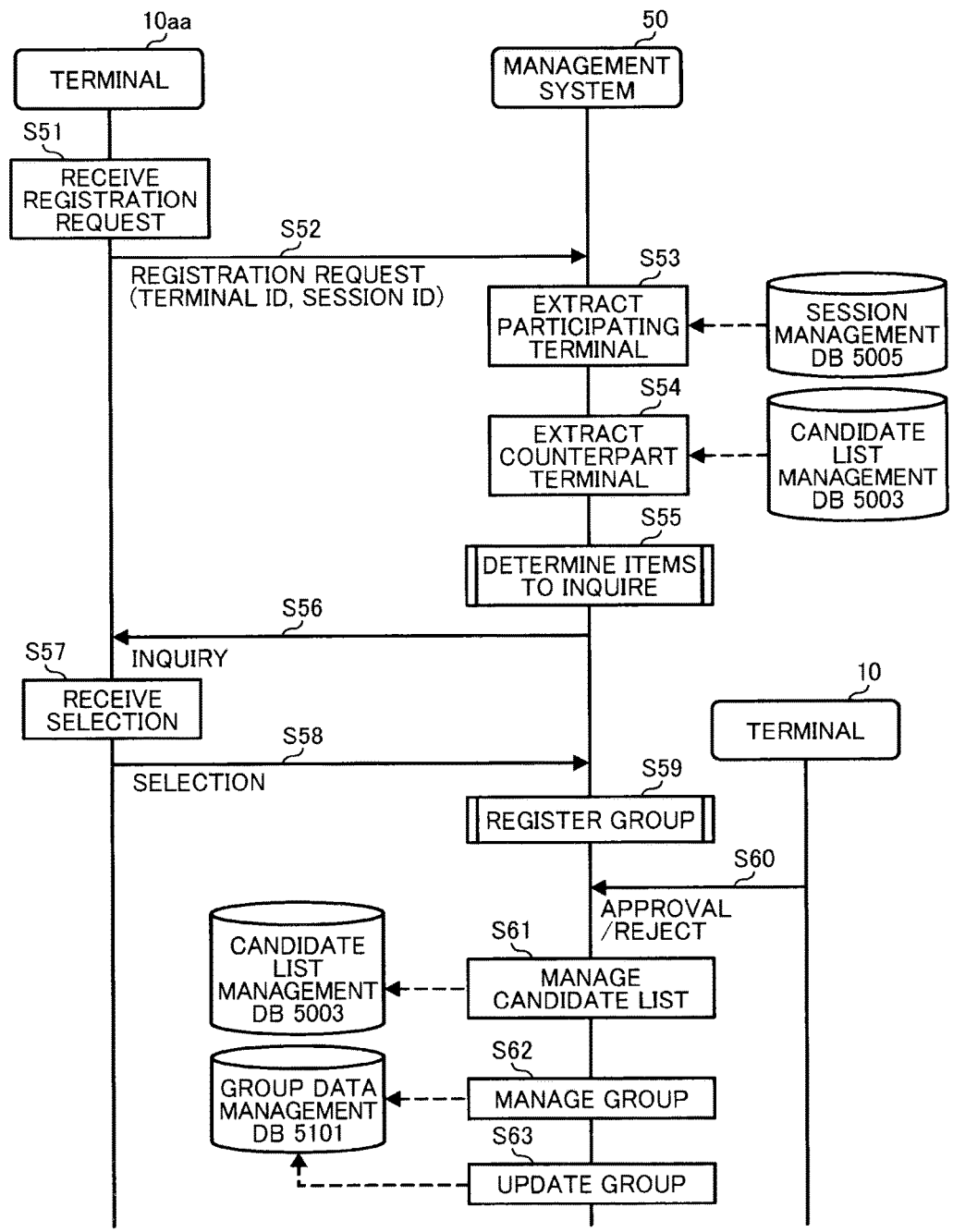
FIG. 16 is a data sequence diagram illustrating operation of processing a request for registering group information, performed by the communication system of FIG. 1, according to an example embodiment of the present invention.

Referring to FIG. 16, operation of processing a group registration request, requested by one of the terminals 10 that are participating in the contents data session, performed by the communication system 1 of FIG. 1, is explained according to an example embodiment of the present invention. In this example, it is assumed that, during when the terminals 10aa, 10ab, 10ac, 10ad, and 10ae are participating in the contents data session "sed", the request terminal 10aa requests the management system 50 to register information regarding the terminals 10 that are currently participating in the session, as group information.

Figure 17:
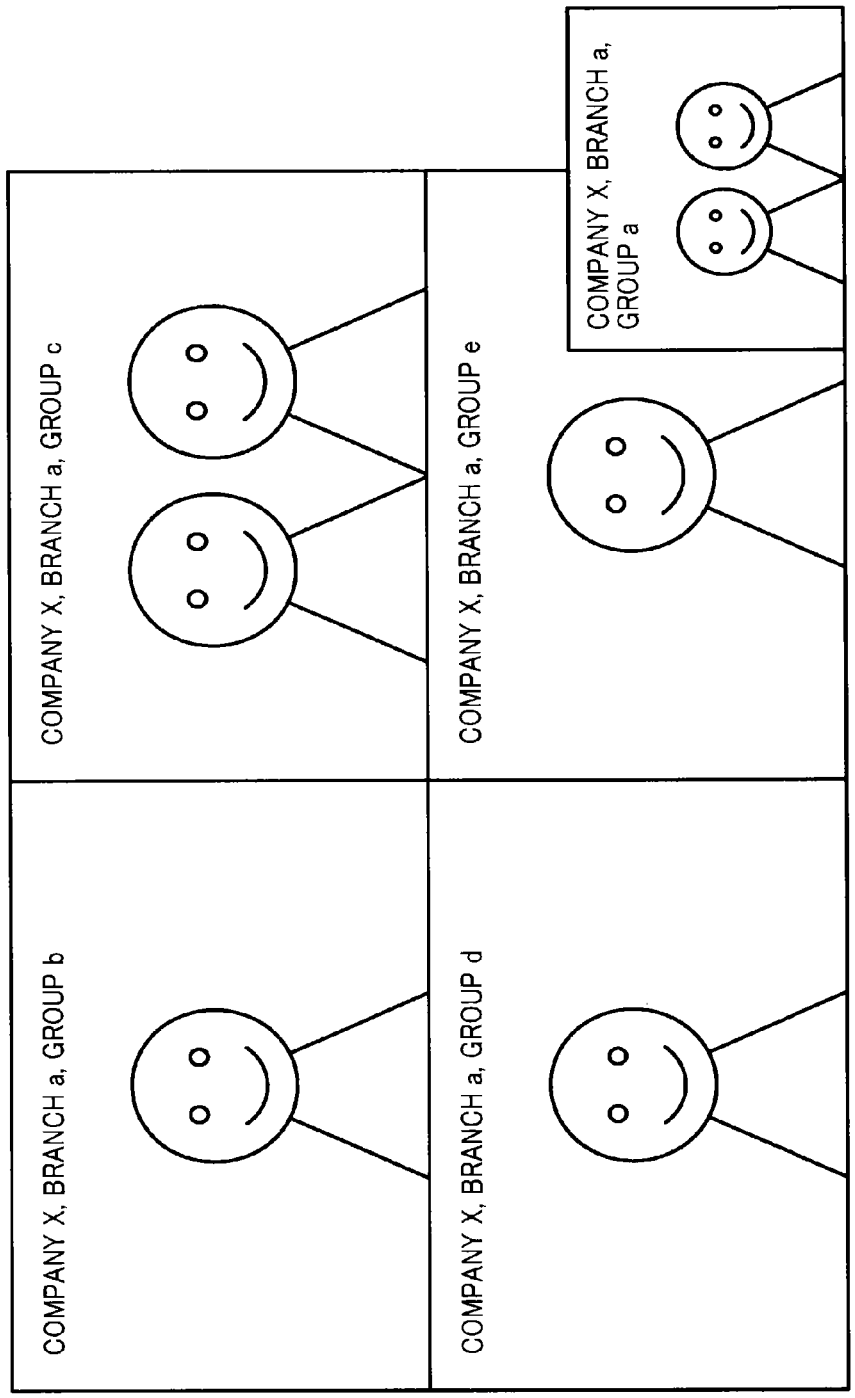
FIG. 17 is an illustration of an example screen to be displayed at a communication terminal, while communicating with another communication terminal.

The terminal 10aa transmits or receives contents data such as image data and sound data through the relay device 30a, with the counterpart terminals 10ab, 10ac, 10ad, and 10ae. The display control 16 of the terminal 10aa causes the display 120 to output images of users at the respective counterpart terminals 10ab, 10ac, 10ad, and 10ae, based on the image data received from the respective counterpart terminals 10ab, 10ac, 10ad, and 10ae. The display control 16 further causes the display 120 to display an image of a user at the terminal 10aa, based on image data obtained at the terminal 10aa. FIG. 17 illustrates an example display screen, which may be output by the display 120 of the terminal 10aa. The sound output 15b of the terminal 10aa causes the speaker 115 to output sounds of users at the respective counterpart terminals 10ab, 10ac, 10ad, and 10ae, based on the sound data received from the respective counterpart terminals 10ab, 10ac, 10ad, and 10ae. With the images and sounds, the user at the terminal 10aa is able to see the participants, i.e., the users at the counterpart terminals 10ab, 10ac, 10ad, and 10ae, and confirm with the other participants whether registration of group information is desirable.

Referring back to FIG. 16, at S51, the operation input 12 of the terminal 10aa receives a user request ("registration request") for registering a group of the participating terminals 10 that are currently participating in the contents data session "sed", which may be input through the operation key 108.

At S52, the data transmitter/receiver 11 of the terminal 10aa transmits registration request information ("registration request"), which requests for group registration, to the management system 50. The registration request includes the terminal ID "01aa" of the request terminal 10aa that sends the registration request, and the session ID "se01" of the contents data session "sed" that the request terminal 10aa is currently participating in. The management system 50 receives the registration request at the data transmitter/receiver 51.

At S53, the extractor 54 of the management system 50 searches the session management table of FIG. 9 using the session ID "se01" as a search key to obtain the terminal IDs of the participating terminals 10 that are participating in the contents data session "se01". In this example, "01aa" "01ab" "01ac" "01ad" and "01ae" are extracted.

At S54, the extractor 54 searches the candidate list management table of FIG. 8 using the terminal ID "01aa" of the request terminal 10aa to obtain candidate counterpart terminal IDs "01ab" "01ac" "01db", etc. of the candidate counterpart terminals 10 that can be selected by the request terminal 10aa for communication.

The destination determiner 55 determines item to be checked with the request terminal 10aa in the process of registering group information, using the terminal ID of the participating terminal 10 and the terminal ID of the candidate counterpart terminal 10.

Figure 18:
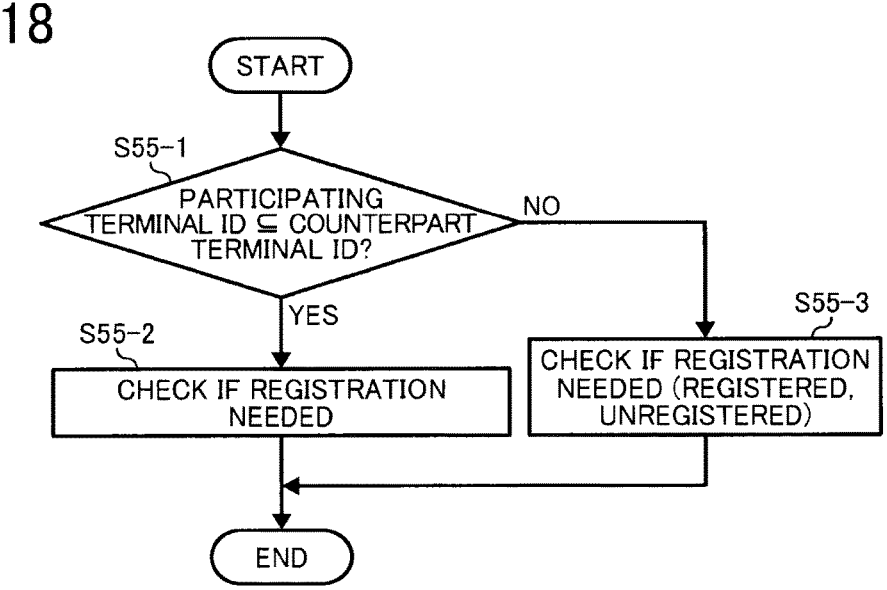
FIG. 18 is a flowchart illustrating operation of determining the items to confirm with a communication terminal that requests for registration of group, performed by the communication management system of FIG. 1, according to an example embodiment of the present invention.

FIG. 18 is a flowchart illustrating operation of determining items to be checked, performed by the management system 50 at S54, according to an example embodiment of the present invention.

At S55-1, the destination determiner 55 determines whether all of the participating terminals 10 except for the request terminal 10aa are registered as the candidate counterpart terminals 10 for the request terminal 10aa. More specifically, the destination determiner 55 determines whether the terminal IDs of the participating terminals 10 except for the request terminal 10aa, which are obtained at S53, are included in the terminal IDs of the candidate counterpart terminals 10 for the request terminal 10aa, which are obtained at S54. When it is determined that all participating terminals except for the request terminal 10aa are registered as candidate counterpart terminals ("YES" at S55-1), the operation proceeds to S55-2. At S55-2, the destination determiner 55 determines to confirm with the request terminal 10aa whether to register the participating terminals 10 as group information.

When it is determined that all participating terminals except for the request terminal 10aa are not registered as candidate counterpart terminals ("NO" at S55-1), the operation proceeds to S55-3. At S55-3, the destination determiner 55 determines to confirm with the request terminal 10aa, for each one of the participating terminals 10 that are registered as the candidate counterpart terminals 10 and the participating terminals 10 that are not registered as the candidate counterpart terminals 10, whether to register the participating terminal 10 as a member of that group of the participating terminals.

Referring back to FIG. 16, at S56, the data transmitter/receiver 51 of the management system 50 transmits confirmation information ("inquiry"), which confirms the request terminal 10aa regarding the items that are determined at S55, to the request terminal 10aa.

Figure 19:
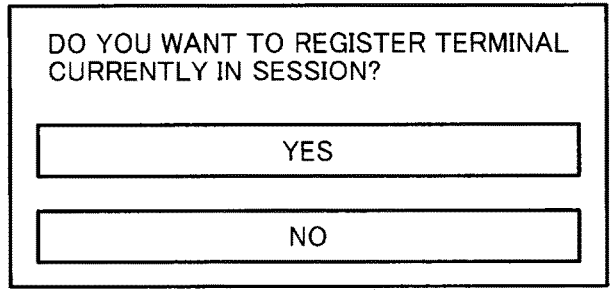
FIG. 19 is an illustration of an example screen that confirms whether to register group information for registered communication terminals.
Figure 20:
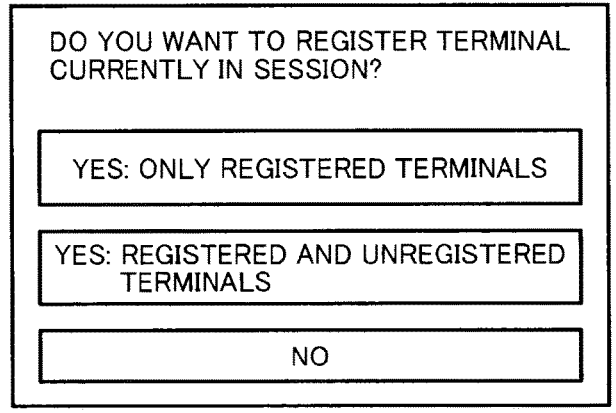
FIG. 20 is an illustration of an example screen that confirms whether to register group information for registered and unregistered communication terminals.

When the data transmitter/receiver 11 of the request terminal 10aa receives the confirmation information, the display control 16 causes the display 120 to display a screen that allows a user to check the items to be confirmed, and input a confirmation result, for example, as illustrated in FIGS. 19 and 20. FIG. 19 is an example screen that confirms the user whether to register the participating terminals as a group. FIG. 20 is an example screen that confirms the user whether to register the participating terminals, for each one of the participating terminal 10 that is registered as the candidate counterpart terminal 10, and the participating terminal 10 that is not registered as the candidate counterpart terminal 10.

Assuming that the user at the request terminal 10aa selects one of the keys from the screen of FIG. 19 or 20, using the operation key 108, at S57, the operation input 12 receives a user input that selects the confirmation result. At S58, the data transmitter/receiver 11 of the request terminal 10aa transmits the confirmation result, such as the selection of the key, to the management system 50.

Based on the confirmation result received from the request terminal 10aa, which is received at the data transmitter/receiver 51 of the management system 50, at S59, the group data manager 60 generates group information such as a group member list to register to the group data management DB 5101.

Figure 21:
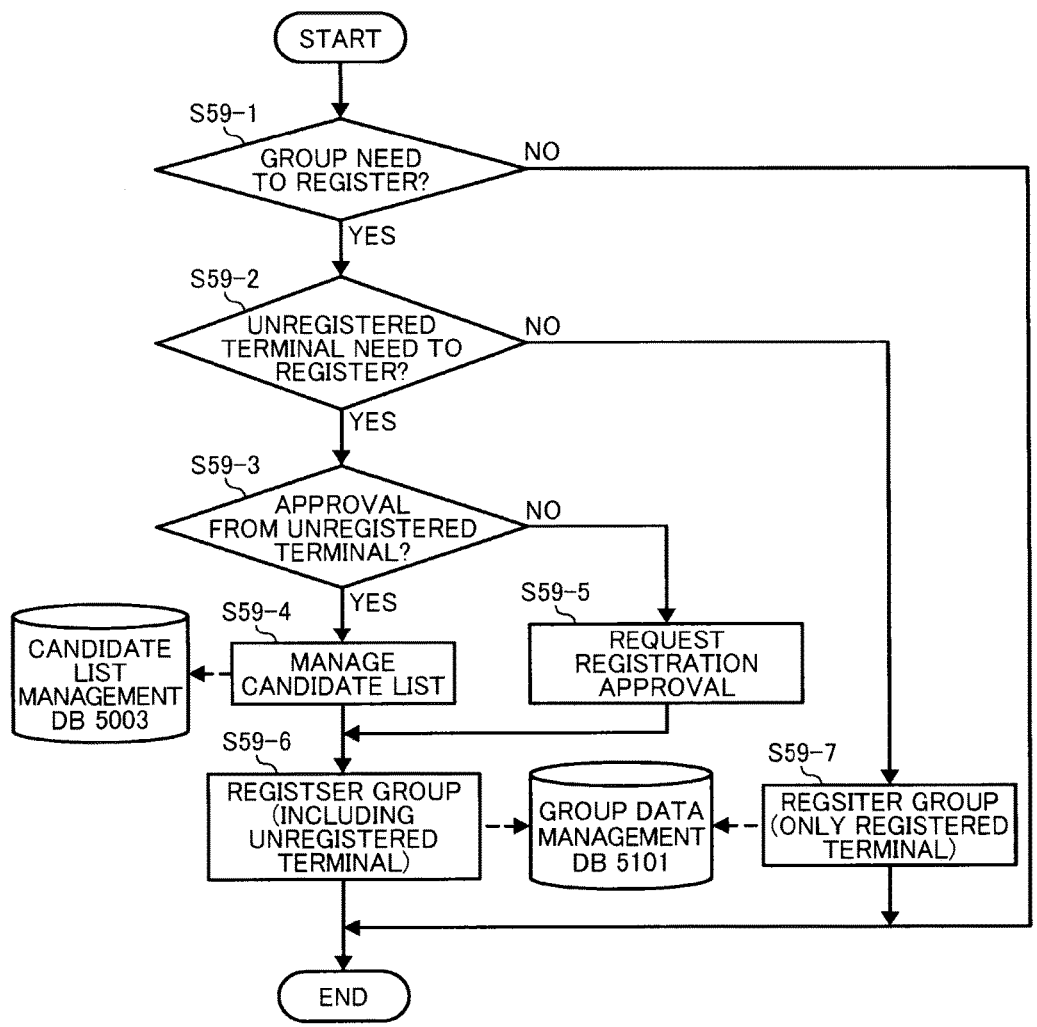
FIG. 21 is a flowchart illustrating operation of registering group information, performed by the communication management system of FIG. 1, according to an example embodiment of the present invention.

FIG. 21 is a flowchart illustrating operation of registering group information, performed by the group data manager 60 at S59.

At S59-1, the group data manager 60 determines whether the confirmation result indicates whether to register the participating terminals 10 as a group of member terminals. When it is determined that the participating terminals 10 are not to be registered ("NO" at S59-1), the operation ends without registering group information. When it is determined that the participating terminals 10 are to be registered ("YES" at S59-1), the operation proceeds to S59-2.

At S59-2, the group data manager 60 determines whether the confirmation result indicates whether the participating terminal 10, which is not registered as the candidate counterpart terminal 10 for the request terminal 10aa, is to be registered.

When it is determined that the confirmation result indicates not to register the participating terminal 10, which is not registered ("NO" at S59-2), the operation proceeds to S59-7. At S59-7, the group data manager 60 registers a group member list, which only includes the participating terminals 10 that are already registered as the candidate counterpart terminal for the request terminal 10aa.

For example, the group data manager 60 generates a group ID "Group 03" that identifies a group to be registered. The group data manager 60 stores the registration date/time in the "date/time registration" field, and the terminal ID of the request terminal 10aa in the "user terminal ID" field, in association with the group ID "Group 03" as illustrated in the group data management table of FIG. 22. The group data manager 60 further stores the terminal ID of each one of the participating terminals 10 that have been registered as the candidate counterpart terminal for the request terminal 10aa, in the "registered member terminal ID" field in association with the group ID "Group 03". More specifically, the terminal IDs of the registered, participating terminals 10 that are participating in the contents data session "sed", are registered to the group data management table of FIG. 22.

When it is determined that the confirmation result indicates to register the participating terminal 10, which is not registered ("YES" at S59-2), the operation proceeds to S59-3. At S59-3, the group data manager 60 determines whether approval is obtained from the unregistered participating terminal 10, which approves registration of the unregistered participating terminal 10 as a candidate counterpart terminal for the request terminal 10aa.

For example, the unregistered participating terminal 10 may ask the user at the unregistered participating terminal 10 whether to approve registration of the terminal 10 as a candidate counterpart terminal for the request terminal 10aa.

Based on the user input through the operation key 108, the operation input 12 may receive a user instruction indicating whether to approve or not approve to register the unregistered participating terminal 10 as a candidate counterpart terminal for the request terminal 10aa. The data transmitter/receiver 11 of the unregistered participating terminal 10 may transmit approval information indicating whether to approve or not approve to register the unregistered participating terminal as a candidate counterpart terminal for the request terminal 10aa, to the management system 50.

When it is determined that the approval is obtained from the unregistered participating terminal 10 ("YES" at S59-3), the operation proceeds to S59-4. At S59-4, the candidate list manager 57 stores the terminal ID of the unregistered participating terminal 10, in the candidate list management table of FIG. 8, as a candidate counterpart terminal ID in association with the request terminal ID "01aa".

When it is determined that approval is not obtained from the unregistered participating terminal 10 ("NO" at S59-3), the operation proceeds to S59-5. At S59-5, the data transmitter/receiver 51 of the management system 50 requests the unregistered participating terminal 10 to approve or not approve to add the unregistered participating terminal 10 as a candidate counterpart terminal for the request terminal 10aa.

After completion of S59-4 or S59-5, at S59-6, the group data manager 60 registers group information regarding a group of the participating terminals 10 that are participating in the contents data session "sed".

For example, the group data manager 60 generates a group ID "Group 03" that identifies the group to be registered. The group data manager 60 stores the date/time registered in the "date/time registered" field, and the terminal ID of the request terminal 10aa that requests for registration in the "user terminal ID" field, in association with the generated group ID as illustrated in the group data management table of FIG. 23. The group data manager 60 further stores the terminal ID of each one of the registered participating terminals 10 that have been registered as the candidate counterpart terminal for the request terminal 10aa, in the "registered member terminal ID" field, in association with the group ID "Group 03". The group data manager 60 further stores the terminal ID of each one of the unregistered participating terminals 10 that are not registered as the candidate counterpart terminal for the request terminal 10aa, in the "tentatively registered member terminal ID" field in association with the group ID "Group 03".

Referring back to FIG. 16, at S60, the data transmitter/receiver 51 of the management system 50 may receive approval information indicating whether to approve or not approve to register the unregistered participating terminal 10, from the unregistered participating terminal 10, in response to the request transmitted at S59-5.

When the approval information indicating to approve registration of the unregistered participating terminal as a candidate counterpart terminal for the request terminal 10aa is received, at S61, the candidate list manager 57 stores the terminal ID of the unregistered participating terminal 10 in the candidate list management table of FIG. 8, as a candidate counterpart terminal ID in association with the request terminal ID "01aa" of the request terminal 10aa.

At S62, the group data manager 60 updates group information in the group data management table of FIG. 23. More specifically, the group data manager 60 refers to the "tentatively registered member terminal ID" field for the group ID "Group 03", in the group data management table of FIG. 23, to delete the terminal ID of the participating terminal 10 that is newly registered at S61. The group data manager 60 further adds the terminal ID of the newly registered participating terminal 10, which is just deleted, in the "registered member terminal ID" field for the group ID "Group 03".

When a predetermined time elapses after registration of group information at S59-6 or S59-7, at S63, the group data manager 60 deletes the remaining terminal IDs stored in the "tentatively registered member terminal ID" field, for the group that has been registered. For example, when the group data manager 60 determines that a predetermined time (such as three days) elapses after the date/time registered stored in the group data management table of FIG. 23, the group data manager 60 deletes the tentatively registered member terminal ID, which still remains, from the group data management table of FIG. 23. The group data manager 60 can then confirm the member terminals belonging to the specific group.

In the above-described example embodiments, the relay device 30, the management system 50, the program providing system 90, and the maintenance system 100 may each be implemented by a single computer. Alternatively, any number of parts, functions, or modules of the relay device 30, the management system 50, the program providing system 90, and the maintenance system 100 may be classified into a desired number of groups to be carried out by a plurality of computers.

For example, the management system 50 may be implemented by a computer functioning as a management apparatus, and a computer functioning as a web application server. In such case, the management apparatus may be provided with a candidate list management DB 5003. The web application server provides web application services to the terminal 10. Based on a request received through the web browser, the web application server may output an instruction for updating the candidate list to the management apparatus. The management apparatus and the web application server may be located within the same country, or located in different countries.

In case the program providing system 90 is implemented by the single computer, the program to be provided by the program providing system 90 may be transmitted, one module by one module, after dividing into a plurality of modules, or may be transmitted at once. In case the program providing system 90 is implemented as a plurality of computers, each computer may transmit each module that is stored in its memory, after the program is divided into a plurality of modules.

In the above-described example embodiments, the terminal ID is used as identification information that identifies any one of the request terminal, counterpart terminal, member terminal, owner terminal, and user terminal. In alternative to or in addition to the terminal ID, user identification (user ID) that identifies a user who operates the terminal 10 may be used. In such case, a user ID of a user who operates a specific terminal, such as the request terminal, counterpart terminal, member terminal, owner terminal, or user terminal, may be used.

In the above-described example embodiments, the candidate list management table (FIG. 8) stores the terminal ID for each one of one or more candidate counterpart terminals that can be selected by the request terminal 10 to have communication. Alternatively, any other information that can identify the candidate counterpart terminal may be stored. Examples of identification information for identifying a candidate counterpart terminal include, but not limited to, a telephone number of a candidate counterpart terminal, and an IP address indicating the network location of a candidate counterpart terminal. The group data management table (FIG. 10) may additionally store a telephone number or an IP address, in association with the member terminal ID, owner terminal ID, and user terminal ID. With the additional information, the management system 50 is able to easily contact the terminal.

A recording medium storing any one of the terminal control program, relay control program, and communication management program, or a storage device such as the HDD 204 that stores any one of the terminal control program, relay control program, and communication management program, or the program providing system 90 provided with the HD 204 storing any one of the terminal control program, relay control program, and communication management program, may be distributed within the country or to another country as a computer program product.

In the above-described example embodiments, the communication system is treated as a videoconference system. Alternatively, the communication system may be implemented as a teleconference system such as the IP teleconference system or the Internet teleconference system, or a computer system. Alternatively, the communication system may be implemented as a car navigation system. For example, the request terminal 10 may be implemented as a car navigation system that is installed onto an automobile. The counterpart terminal 10 may be implemented as a management terminal or server at a management center that manages the car navigation system or a car navigation system that is installed onto another automobile. In another example, the communication system may be implemented as a communication system having a portable phone, smart phone, tablet, game machine, etc. In such case, the terminal 10 may be implemented as the portable phone, smart phone, tablet, game machine, etc.

In the above-described examples, the contents data is assumed to include image data and sound data such as voice data. Alternatively, the contents data may include any other type of data that affects human senses of sight in alternative to image data, or any other type of data that affects human senses of hearing in alternative to voice data. Alternatively, the contents data may include any other type of data that affects human senses of sight, smell, taste, touch, and hearing. In case the contents data that affects human senses of touch, the terminal 10 may convey the contents data that reflects senses of touch that is felt by a user at the terminal 10 to another terminal 10 through the communication network 2. In case the contents data that affects human senses of smell, the terminal 10 may convey the contents data that affects senses of smell felt by a user at the terminal 10 to another terminal 10 through the communication network 2. In case the contents data that affects human senses of taste, the terminal 10 may convey the contents data that affects senses of taste felt by a user at the terminal 10 to another terminal 10 through the communication network 2.

Further, the contents data may only include one type of contents data selected from sight data such as image data, hearing data such as voice data, touch data, smell data, and taste data.

Further, in the above-described examples, the communication system is implemented as a videoconference system for use at offices. Other examples of use of the communication system include, but not limited to, meetings, casual conversation among family members or friends, and distribution of information in one direction.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

Further, any of the above-described devices or units can be implemented as a hardware apparatus, such as a special-purpose circuit or device, or as a hardware/software combination, such as a processor executing a software program.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cashe memory of the CPU, and the RAM may function as a physical memory or a primary memory of the apparatus, while the HDD may function as a secondary memory of the apparatus.

What is claimed is:

1. A communication management system, comprising:
circuitry configured to:
    manage session information regarding a contents data session being established to communicate contents data among a plurality of participating communication terminals; and
    receive a request for registering a group of the plurality of participating communication terminals that are currently participating in the contents data session, from a first participating communication terminal of the plurality of participating communication terminals, during the contents data session,
    wherein, in response to the request for registering, the circuitry is configured to store first candidate information of the first participating communication terminal in a first memory, the first candidate information associating the group of the plurality of participating communication terminals with the first participating communication terminal; and
a second memory that stores second candidate information of the first participating communication terminal, the second candidate information associating one or more candidate counterpart communication terminals, each selectable by the first participating communication terminal to have communication, with the first participating communication terminal, wherein, in response to the request for registering, the circuitry is configured to:

determine whether any one of the plurality of participating communication terminals is registered as a candidate counterpart terminal for the first participating communication terminal in the second memory, identify at least one unregistered participating communication terminal that is not registered in the second memory, and exclude the unregistered participating communication terminal from the group of the plurality of participating communication terminals to be stored in the first memory as the first candidate information.

2. The communication management system of claim 1, wherein the circuitry is configured to receive approval information indicating whether to approve or not to approve to register the unregistered participating communication terminal, as the candidate counterpart terminal for the first participating communication terminal, from the unregistered participating communication terminal through a network, and in response to the approval information, the circuitry is configured to update the first candidate information of the first participating communication terminal based on the approval information.

3. The communication management system of claim 2, wherein when the approval information indicates to approve to register the unregistered participating communication terminal, the circuitry is configured to register the unregistered participating communication terminal as the candidate counterpart terminal for the first participating communication terminal in the second memory, and update the first candidate information so as to additionally include the participating communication terminal that is newly registered in the second memory.

4. The communication management system of claim 2, wherein information regarding the unregistered participating communication terminal is tentatively stored in the first memory in association with the first participating communication terminal.

5. The communication management system of claim 4, wherein when the approval information indicates not to approve registration of the unregistered participating communication terminal, the circuitry is configured to delete the information regarding the unregistered participating communication terminal from the first memory.

6. The communication management system of claim 4, wherein when a predetermined time elapses after storing the first candidate information including the information regarding the unregistered participating communication terminal, the circuitry is configured to delete the information regarding the unregistered participating communication terminal from the first memory.

7. The communication management system of claim 1, further comprising:

a third memory that stores, for each one of the plurality of participating communication terminals, terminal identification information that identifies the participating communication terminal, wherein the circuitry is configured to obtain the first candidate information of the first participating communication terminal using the terminal identification information.

8. A communication system, comprising:

the communication management system of claim 1; and the first participating communication terminal, comprising:

a user interface that receives a user input that requests for registering the group of the plurality of participating communication terminals; and a network interface that sends the request for registering to the communication management system through a network.

9. A communication system, comprising:

the communication management system of claim 2; and the unregistered participating communication terminal, comprising:

a user interface that receives a user input that indicates whether to approve or not to approve registration of the unregistered participating communication terminal as the candidate counterpart terminal for the first participating communication terminal; and a network interface that sends the approval information based on the user input to the communication management system through a network.

10. A method of controlling candidate information, comprising:

managing session information regarding a contents data session being established to communicate contents data among a plurality of participating communication terminals;

receiving a request for registering a group of the plurality of participating communication terminals that are currently participating in the contents data session, from a first participating communication terminal of the plurality of participating communication terminals, during the contents data session;

in response to the request for registering, storing first candidate information of the first participating communication terminal in a first memory, the first candidate information associating the group of the plurality of participating communication terminals with the first participating communication terminal;

storing, in a second memory, second candidate information of the first participating communication terminal, the second candidate information associating one or more candidate counterpart communication terminals, each selectable by the first participating communication terminal to have communication, with the first participating communication terminal; and in response to the request for registering, determining whether any one of the plurality of participating communication terminals is registered as a candidate counterpart terminal for the first participating communication terminal in the second memory, identifying at least one unregistered participating communication terminal that is not registered in the second memory, and excluding the unregistered participating communication terminal from the group of the plurality of participating communication terminals to be stored in the first memory as the first candidate information.

11. A non-transitory recording medium storing a plurality of instructions which, when executed by a processor, cause the processor to perform a method, comprising:

managing session information regarding a contents data session being established to communicate contents data among a plurality of participating communication terminals;

receiving a request for registering a group of the plurality of participating communication terminals that are currently participating in the contents data session, from a first participating communication terminal of the plurality of participating communication terminals, during the contents data session;

in response to the request for registering, storing first candidate information of the first participating communication terminal in a first memory, the first candidate information associating the group of the plurality of participating communication terminals with the first participating communication terminal;

storing, in a second memory, second candidate information of the first participating communication terminal, the second candidate information associating one or more candidate counterpart communication terminals, each selectable by the first participating communication terminal to have communication, with the first participating communication terminal; and in response to the request for registering,
- determining whether any one of the plurality of participating communication terminals is registered as a candidate counterpart terminal for the first participating communication terminal in the second memory,
- identifying at least one unregistered participating communication terminal that is not registered in the second memory, and
- excluding the unregistered participating communication terminal from the group of the plurality of participating communication terminals to be stored in the first memory as the first candidate information.

* * * * *